(12) United States Patent
Paul et al.

(10) Patent No.: US 8,078,465 B2
(45) Date of Patent: Dec. 13, 2011

(54) SYSTEM AND METHOD FOR DETECTION AND ANALYSIS OF SPEECH

(75) Inventors: Terrance Paul, Boulder, CO (US); Dongxin Xu, Boulder, CO (US); Umit Yapenel, Superior, CO (US); Sharmistha Gray, Thornton, CO (US)

(73) Assignee: LENA Foundation, Boulder, CO (US)

( * ) Notice: Subject to any disclaimer, the term of this patent is extended or adjusted under 35 U.S.C. 154(b) by 963 days.

(21) Appl. No.: 12/018,647

(22) Filed: Jan. 23, 2008

(65) Prior Publication Data

US 2008/0235016 A1    Sep. 25, 2008

Related U.S. Application Data

(60) Provisional application No. 60/886,122, filed on Jan. 23, 2007, provisional application No. 60/886,167, filed on Jan. 23, 2007.

(51) Int. Cl.
| G10L 15/14 | (2006.01) |
| G10L 15/04 | (2006.01) |
| G10L 17/00 | (2006.01) |
| G10L 15/06 | (2006.01) |

(52) U.S. Cl. ...... 704/254; 704/246; 704/250; 704/256.7

(58) Field of Classification Search .................. 704/1–9, 704/231–257, 270–271, E17.001–E17.016, 704/E15.001–E15.05, E11.001–E11.007
See application file for complete search history.

(56) References Cited

U.S. PATENT DOCUMENTS

| 4,464,119 A | | 8/1984 | Vildgrube et al. |
| 4,857,030 A | * | 8/1989 | Rose ............................. 446/303 |
| 5,659,662 A | * | 8/1997 | Wilcox et al. ................. 704/245 |
| 5,679,001 A | | 10/1997 | Russell et al. |
| 5,717,828 A | * | 2/1998 | Rothenberg ................... 704/251 |
| 5,813,862 A | * | 9/1998 | Merzenich et al. ........... 434/185 |

(Continued)

FOREIGN PATENT DOCUMENTS

WO    WO 2006/034029 A    3/2006

OTHER PUBLICATIONS

Huang et al. "A Mandarin Speech Dictation System Based on Neural Network and Language PRocessing Model." IEEE Transactions on Consumer Electronics, vol. 40, No. 3. IEEE: Aug. 1994.*

(Continued)

*Primary Examiner* — James S. Wozniak
*Assistant Examiner* — David Kovacek
(74) *Attorney, Agent, or Firm* — Patton Boggs LLP

(57) ABSTRACT

Certain aspects and embodiments of the present invention are directed to systems and methods for monitoring and analyzing the language environment and the development of a key child. A key child's language environment and language development can be monitored without placing artificial limitations on the key child's activities or requiring a third party observer. The language environment can be analyzed to identify words, vocalizations, or other noises directed to or spoken by the key child, independent of content. The analysis can include the number of responses between the child and another, such as an adult and the number of words spoken by the child and/or another, independent of content of the speech. One or more metrics can be determined based on the analysis and provided to assist in improving the language environment and/or tracking language development of the key child.

26 Claims, 12 Drawing Sheets

U.S. PATENT DOCUMENTS

| | | | |
|---|---|---|---|
| 5,873,728 A | | 2/1999 | Jeong |
| 5,884,259 A | * | 3/1999 | Bahl et al. .................... 704/252 |
| 5,893,720 A | * | 4/1999 | Cohen ............................ 434/327 |
| 5,953,701 A | * | 9/1999 | Neti et al. ..................... 704/254 |
| 5,960,397 A | * | 9/1999 | Rahim ........................... 704/244 |
| 5,966,691 A | * | 10/1999 | Kibre et al. ................... 704/260 |
| 6,029,124 A | * | 2/2000 | Gillick et al. ................. 704/200 |
| 6,071,123 A | | 6/2000 | Tallal et al. |
| 6,123,548 A | | 9/2000 | Tallal et al. |
| 6,157,913 A | | 12/2000 | Bernstein |
| 6,173,260 B1 | * | 1/2001 | Slaney .......................... 704/250 |
| 6,212,502 B1 | | 4/2001 | Ball et al. |
| 6,246,985 B1 | * | 6/2001 | Kanevsky et al. ............ 704/270 |
| 6,253,181 B1 | * | 6/2001 | Junqua .......................... 704/255 |
| 6,336,089 B1 | | 1/2002 | Everding |
| 6,341,267 B1 | | 1/2002 | Taub |
| 6,395,482 B1 | | 5/2002 | Karayiorgou et al. |
| 6,405,167 B1 | * | 6/2002 | Cogliano ....................... 704/251 |
| 6,539,352 B1 | * | 3/2003 | Sharma et al. ................ 704/249 |
| 6,554,617 B1 | | 4/2003 | Dolan |
| 6,697,778 B1 | | 2/2004 | Kuhn et al. |
| 6,725,198 B2 | | 4/2004 | Waryas et al. |
| 6,732,076 B2 | | 5/2004 | Masterson et al. |
| 6,807,395 B2 | | 10/2004 | Iwazaki et al. |
| 7,184,959 B2 | * | 2/2007 | Gibbon et al. ................ 704/270 |
| 7,275,034 B2 | | 9/2007 | Odell et al. |
| 7,295,970 B1 | * | 11/2007 | Gorin et al. ................... 704/221 |
| 7,590,513 B2 | * | 9/2009 | Jiang et al. ........................ 703/2 |
| 7,603,276 B2 | * | 10/2009 | Yoshizawa ................ 704/256.2 |
| 7,627,475 B2 | | 12/2009 | Petrushin |
| 7,711,652 B2 | * | 5/2010 | Schmelzer ....................... 705/67 |
| 7,720,012 B1 | * | 5/2010 | Borah et al. .................. 370/260 |
| 7,930,179 B1 | * | 4/2011 | Gorin et al. ................... 704/246 |
| 8,009,193 B2 | * | 8/2011 | Zhou et al. .................... 348/143 |
| 2002/0150869 A1 | | 10/2002 | Shpiro |
| 2003/0009333 A1 | * | 1/2003 | Sharma et al. ................ 704/246 |
| 2003/0033145 A1 | | 2/2003 | Petrushin |
| 2003/0144839 A1 | | 7/2003 | Dharanipragada et al. |
| 2004/0111263 A1 | * | 6/2004 | Nishitani et al. .............. 704/256 |
| 2004/0143434 A1 | * | 7/2004 | Divakaran et al. ............ 704/256 |
| 2004/0199386 A1 | * | 10/2004 | Attias et al. ................... 704/240 |
| 2004/0236573 A1 | * | 11/2004 | Sapeluk ......................... 704/224 |
| 2004/0236577 A1 | * | 11/2004 | Nishitani et al. .............. 704/256 |
| 2005/0131688 A1 | * | 6/2005 | Goronzy et al. .............. 704/240 |
| 2005/0251532 A1 | * | 11/2005 | Radhakrishnan et al. . 707/104.1 |
| 2006/0053014 A1 | * | 3/2006 | Yoshizawa ................ 704/256.4 |
| 2006/0058998 A1 | * | 3/2006 | Yamamoto et al. ........... 704/254 |
| 2006/0058999 A1 | * | 3/2006 | Barker et al. ................. 704/256 |
| 2006/0074656 A1 | * | 4/2006 | Mathias et al. ............... 704/243 |
| 2006/0136217 A1 | * | 6/2006 | Mullin ........................... 704/270 |
| 2006/0212296 A1 | * | 9/2006 | Espy-Wilson et al. ........ 704/254 |
| 2007/0172805 A1 | * | 7/2007 | Paul ............................... 434/308 |
| 2007/0198263 A1 | * | 8/2007 | Chen .............................. 704/246 |
| 2007/0239441 A1 | * | 10/2007 | Navratil et al. ............... 704/225 |
| 2008/0082337 A1 | * | 4/2008 | Joublin et al. ................. 704/254 |
| 2008/0159560 A1 | * | 7/2008 | Song et al. ................... 381/94.1 |
| 2008/0208581 A1 | * | 8/2008 | Pelecanos et al. ............ 704/250 |
| 2008/0235016 A1 | | 9/2008 | Paul et al. |
| 2008/0235017 A1 | | 9/2008 | Satomura |
| 2008/0243503 A1 | * | 10/2008 | Soong et al. .................. 704/244 |
| 2009/0155751 A1 | * | 6/2009 | Paul et al. ...................... 434/185 |
| 2009/0191521 A1 | * | 7/2009 | Paul et al. ...................... 434/169 |
| 2009/0208913 A1 | * | 8/2009 | Xu et al. ........................ 434/169 |
| 2010/0204993 A1 | * | 8/2010 | Vogt .............................. 704/250 |

OTHER PUBLICATIONS

Ajmera et al. "Speech/music segmentation using entropy and dynamism features in a HMM classification framework." Speech Communication 40 (2003), pp. 351-363. Elsevier Science B. V.: 2002.*

Mahdhaoui et al. "Automatic Motherese Detection for Face-to-Face Interaction Analysis." Multimodal Signals, LNAI 5398, pp. 248-255. Springer-Verlag Berlin Heidelberg: 2009.*

Slaney et al. "BabyEars: A recognition system for affective vocalizations." Speech Communications 29 (2003), pp. 367-384. Elsevier Science B.V.: 2002.*

Fredouille et al. "Application of Automatic Speaker Recognition techniques to pathological voice assessment (dysphonia)." Author Manuscript. Consultez L'Archive Half-Vous: 2007.*

Mahdhaoui et al. "Motherese Detection Based on Segmental and Supra-Segmental Features." IEEE: 2008.*

International Search Report dated Mar. 26, 2010, 3 pages.

Fell et al., Using Early Vocalization Analysis for Visual Feedback.

Fell et al., Automatic Babble Recognition for Early Detection of Speech Related Disorders, ACM Assets '98, Marina del Rey, CA USA.

Fell et al., Analysis of Infant Babble by the Early Vocalization Analyzer, presented at the American Speech-Language-Hearing Convention, Nov. 17, 2000.

Northeastern University College of Computer and Information Science—Faculty Members, www.ccs.neu.edu/groups/faculty/fell.html.

Harriet Fell's Home Page, www.ccs.neu.edu/home/fell.

Samuel, Instructional Resources for Pronunciation Practice, www.utoronto.ca/writing/pronunciation.html.

Joel MacAuslan, Ph.D., Founder and President, biography.

The Guide to Computing Literature, portal.acm.org/results.cfm?query+author.

Fell et al., EVA, an Early Vocalization Analyzer—An Empirical Validity Study of Computer Categorization, ftp.cs.rpi.edu/pub/assets96/paerps/ascii/Fell.txt.

Fell et al., Vocalization Ages as a Clinical Tool, presented at the 7th International Conference on Spoken Language Processing, Sep. 16-20, 2002, Denver, Colorado, USA.

Yapanel et al., A New Perceptually Motivated MVDR-Based Acoustic Front-End (PMVDR) for Robust Automatic Speech Recognition, The Center for Spoken Language Research, Unversity of Colorado at Boulder, USA, Jun. 21, 2004.

MVDR Based Feature Extraction for Robust Speech Recognition, Tech TIPS Technology Case, University of California, San Diego, Invent.ucsd.edu/technology/cases/2001/sd2001-138.html.

Fell et al.; "Analysis of Infant Babble by the Early Vocalization Analyzer"; presented at the American Speech-Language-Hearing Convention; Nov. 17, 2000.

Fell et al.; "Automatic Babble Recognition for Early Detection of Speech Related Disorders"; Proceedings of The Third International ACM SIGCAPH Conference on Assistive Technologies; Apr. 15-17, 1998; Marina del Rey, CA.

Fell et al.; "EVA, an Early Vocalization Analyzer—An Empirical Validity Study of Computer Categorization"; ftp.cs.rpl.edu/pub/assets96/paerps/ascii/Fell.txt.

Fell et al.; "Using Early Vocalization Analysis for Visual Feedback".

Fell et al.; "Vocalization Age as a Clinical Tool"; presented at the 7th International Conference on Spoken Language Processing; Sep. 16-20, 2002; Denver, CO.

Harriet Fell's Home Page; www.ccs.neu.edu/home/fell.

Magrin-Chagnolleau et al.; "Detection of Target Speakers in Audio Databases"; 1999 IEEE International Conference on Acoustics, Speech, and Signal Processing; Mar. 15-19, 1999; Phoenix, Arizona; pp. 821-824.

MVDR Based Feature Extraction for Robust Speech Recognition; Tech TIPS Technology Case; University of California, San Diego; Invent.ucsd.edu/technology/cases/2001/sd2001-138.html.

Northeastern University College of Computer and Information Science—Faculty Members; www.ccs.neu.edu/groups/faculty/fell.html.

Samuel; "Instructional Resources for Pronunciation Practice"; www.utoronto.ca/writing/pronunciation.html.

The Guide to Computing Literature; portal.acm.org/results.cfm?query+author.

Yapanel et al.; "A New Perceptually Motivated MVDR-Based Acoustic Front-End (PMVDR) for Robust Automatic Speech Recognition"; The Center for Spoken Language Research; University of Colorado at Boulder; Jun. 21, 2004.

* cited by examiner

SYSTEM AND METHOD FOR DETECTION AND ANALYSIS OF SPEECH

CROSS-REFERENCE TO RELATED APPLICATIONS

This application claims priority to U.S. Provisional Patent Application Ser. No. 60/886,122 entitled "System and Method for Detection and Analysis of Speech," filed Jan. 23, 2007, and U.S. Provisional Patent Application Ser. No. 60/886,167 entitled "Pocket for Positioning a Voice Recorder," filed Jan. 23, 2007, the entirety of each of which is incorporated herein by reference.

This application is related to U.S. Ser. No. 11/162,520 entitled "Systems and Methods for Learning Using Contextual Feedback" filed Sep. 13, 2005 (the "'520 application"), which claims priority to U.S. Provisional Application No. 60/522,340 filed Sep. 16, 2004, both of which are incorporated herein by reference.

FIELD OF THE INVENTION

The present invention relates generally to signal processing and automated speech recognition and, specifically, to processing recordings of a key child's language environment and generating metrics associated with the language environment and key child language development.

BACKGROUND

As discussed in more detail in the '520 application, the language environment surrounding a young child is key to the child's development. A child's language and vocabulary ability at age three, for example, can indicate intelligence and test scores in academic subjects such as reading and math at later ages. Improving language ability typically results in a higher intelligent quotient (IQ) as well as improved literacy and academic skills.

Exposure to a rich aural or listening language environment in which many words are spoken with a relatively high number of affirmations versus prohibitions may promote an increase in the child's language ability and IQ. The effect of a language environment surrounding a child of a young age on the child's language ability and IQ may be particularly pronounced. In the first four years of human life, a child experiences a highly intensive period of speech and language development due in part to the development and maturing of the child's brain. Even after children begin attending school or reading, much of the child's language ability and vocabulary, including the words known (receptive vocabulary) and the words the child uses in speech (expressive vocabulary), are developed from conversations the child experiences with other people.

In addition to hearing others speak to them and responding (i.e. conversational turns), a child's language development may be promoted by the child's own speech. The child's own speech is a dynamic indicator of cognitive functioning, particularly in the early years of a child's life. Research techniques have been developed which involve counting a young child's vocalizations and utterances to estimate a child's cognitive development. Current processes of collecting information may include obtaining data via a human observer and/or a transcription of an audio recording of the child's speech. The data is analyzed to provide metrics with which the child's language environment can be analyzed and potentially modified to promote increasing the child's language development and IQ.

The presence of a human observer, however, may be intrusive, influential on the child's performance, costly, and unable to adequately obtain information on a child's natural environment and development. Furthermore, the use of audio recordings and transcriptions is a costly and time-consuming process of obtaining data associated with a child's language environment. The analysis of such data to identify canonical babbling, count the number of words, and other vocalization metrics and determine content spoken is also time intensive.

Counting the number of words and determining content spoken may be particularly time and resource intensive, even for electronic analysis systems, since each word is identified along with its meaning. Accordingly, a need exists for methods and systems for obtaining and analyzing data associated with a child's language environment independent of content and reporting metrics based on the data in a timely manner.

SUMMARY

Certain embodiments of the present invention provide methods and systems for providing metrics associated with a key child's language environment and development in a relatively quick and cost effective manner. The metrics may be used to promote improvement of the language environment, key child's language development, and/or to track development of the child's language skills. In one embodiment of the present invention, a method is provided for generating metrics associated with the key child's language environment. An audio recording from the language environment can be captured. The audio recordings may be segmented into a plurality of segments. A segment ID can be identified for each of the plurality of segments. The segment ID may identify a source for audio in the segment of the recording. Key child segments can be identified from the segments. Each of the key child segments may have the key child as the segment ID. Key child segment characteristics can be estimated based in part on at least one of the key child segments. The key child segment characteristics can be estimated independent of content of the key child segments. At least one metric associated with the language environment and/or language development may be determined using the key child segment characteristics. Examples of metrics include the number of words or vocalizations spoken by the key child in a pre-set time period and the number of conversational turns. The at least one metric can be outputted.

In some embodiments, adult segments can be identified from the segments. Each of the adult segments may have the adult as the segment ID. Adult segment characteristics can be estimated based in part on at least one of the adult segments. The adult segment characteristics can be estimated independent of content of the adult segments. At least one metric associated with the language environment may be determined using the adult segment characteristics.

In one embodiment of the present invention, a system for providing metrics associated with a key child's language environment is provided. The system may include a recorder and a processor-based device. The recorder may be adapted to capture audio recordings from the language environment and provide the audio recordings to a processor-based device. The processor-based device may include an application having an audio engine adapted to segment the audio recording into segments and identify a segment ID for each of the segments. At least one of the segments may be associated with a key child segment ID. The audio engine may be further adapted to estimate key child segment characteristics based in part on the at least one of the segments, determine at least one metric associated with the language environment or language development using the key child segment characteristics, and output the at least one metric to an output device. The audio engine may estimate the key child segment characteristics independent of content of the segments.

These embodiments are mentioned not to limit or define the invention, but to provide examples of embodiments of the invention to aid understanding thereof. Embodiments are discussed in the Detailed Description and advantages offered by various embodiments of the present invention may be further understood by examining the Detailed Description and Drawings.

BRIEF DESCRIPTION OF THE DRAWINGS

These and other features, aspects, and advantages of the present invention are better understood when the following Detailed Description is read with reference to the accompanying drawings, wherein:

FIG. 2b is a side view of the recorder and pocket of FIG. 2a;

DETAILED DESCRIPTION

Figure 1:
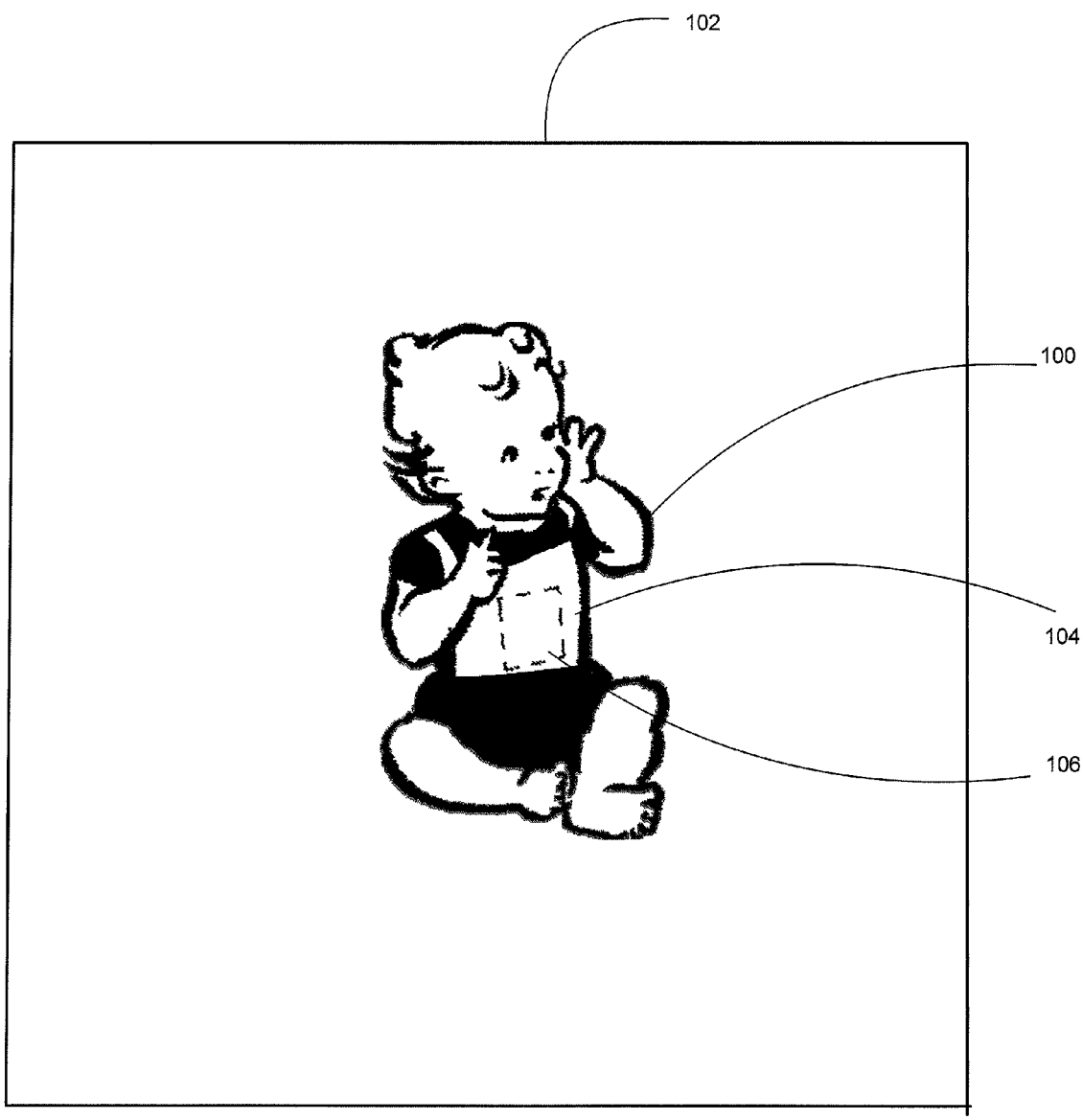
FIG. 1 illustrates a key child's language environment according to one embodiment of the present invention.

Certain aspects and embodiments of the present invention are directed to systems and methods for monitoring and analyzing the language environment, vocalizations, and the development of a key child. A key child as used herein may be a child, an adult, such as an adult with developmental disabilities, or any individual whose language development is of interest. A key child's language environment and language development can be monitored without placing artificial limitations on the key child's activities or requiring a third party observer. The language environment can be analyzed to identify words or other noises directed to or vocalized by the key child independent of content. Content may include the meaning of vocalizations such as words and utterances. The analysis can include the number of responses between the child and another, such as an adult (referred to herein as "conversational turns"), and the number of words spoken by the child and/or another, independent of content of the speech.

A language environment can include a natural language environment or other environments such as a clinical or research environment. A natural language environment can include an area surrounding a key child during his or her normal daily activities and contain sources of sounds that may include the key child, other children, an adult, an electronic device, and background noise. A clinical or research environment can include a controlled environment or location that contains pre-selected or natural sources of sounds.

In some embodiments of the present invention, the key child may wear an article of clothing that includes a recording device located in a pocket attached to or integrated with the article of clothing. The recording device may be configured to record and store audio associated with the child's language environment for a predetermined amount of time. The audio recordings can include noise, silence, the key child's spoken words or other sounds, words spoken by others, sounds from electronic devices such as televisions and radios, or any sound or words from any source. The location of the recording device preferably allows it to record the key child's words and noises and conversational turns involving the key child without interfering in the key child's normal activities. During or after the pre-set amount of time, the audio recordings stored on the recording device can be analyzed independent of content to provide characteristics associated with the key child's language environment or language development. For example, the recordings may be analyzed to identify segments and assign a segment ID or a source for each audio segment using a Minimum Duration Gaussian Mixture Model (MD-GMM).

Sources for each audio segment can include the key child, an adult, another child, an electronic device, or any person or object capable of producing sounds. Sources may also include general sources that are not associated with a particular person or device. Examples of such general sources include noise, silence, and overlapping sounds. In some embodiments, sources are identified by analyzing each audio segment using models of different types of sources. The models may include audio characteristics commonly associated with each source. In some embodiments, certain audio segments may not include enough energy to determine the source and may be discarded or identified as a noise source. Audio segments for which the key child or an adult is identified as the source may be further analyzed, such as by determining certain characteristics associated with the key child and/or adult, to provide metrics associated with the key child's language environment or language development.

In some embodiments of the present invention, the key child is a child between the ages of zero and four years old. Sounds generated by young children differ from adult speech in a number of respects. For example, the child may generate a meaningful sound that does not equate to a word; the transitions between formants for child speech are less pronounced than the transitions for adult speech, and the child's speech changes over the age range of interest due to physical changes in the child's vocal tract. Differences between child and adult speech may be recognized and used to analyze child speech and to distinguish child speech from adult speech, such as in identifying the source for certain audio segments.

Using the independent of content aspects of certain embodiments of the present invention rather than a system that uses speech recognition to determine content may result in greatly reduced processing time of an audio file using a system that is significantly less expensive. In some embodiments, speech recognition processing may be used to generate metrics of the key child's language environment and language development by analyzing vocalizations independent of content. In one embodiment, the recommended recording time is twelve hours with a minimum time of ten hours. In order to process the recorded speech and to provide meaningful feedback on a timely basis, certain embodiments of the present invention are adapted to process a recording at or under half of real time. For example, the twelve-hour recording may be processed in less than six hours. Thus, the recordings may be processed overnight so that results are available the next morning. Other periods of recording time may be sufficient for generating metrics associated with the key child's language environment and/or language development depending upon the metrics of interest and/or the language environment. A one to two hour recording time may be sufficient in some circumstances such as in a clinical or research environment. Processing for such recording times may be less than one hour.

Audio Acquisition

As stated above, a recording device may be used to capture, record, and store audio associated with the key child's language environment and language development. The recording device may be any type of device adapted to capture and store audio and to be located in or around a child's language environment. In some embodiments, the recording device includes one or more microphones connected to a storage device and located in one or more rooms that the key child often occupies. In other embodiments, the recording device is located in an article of clothing worn by the child.

FIG. 1 illustrates a key child, such as child 100, in a language environment 102 wearing an article of clothing 104 that includes a pocket 106. The pocket 106 may include a recording device (not shown) that is adapted to record audio from the language environment 102. The language environment 102 may be an area surrounding the child 100 that includes sources for audio (not shown), including one or more adults, other children, and/or electronic devices such as a television, a radio, a toy, background noise, or any other source that produces sounds. Examples of language environment 102 include a natural language environment and a clinical or research language environment. The article of clothing 104 may be a vest over the child's 100 normal clothing, the child's 100 normal clothing, or any article of clothing commonly worn by the key child.

Figure 2A:
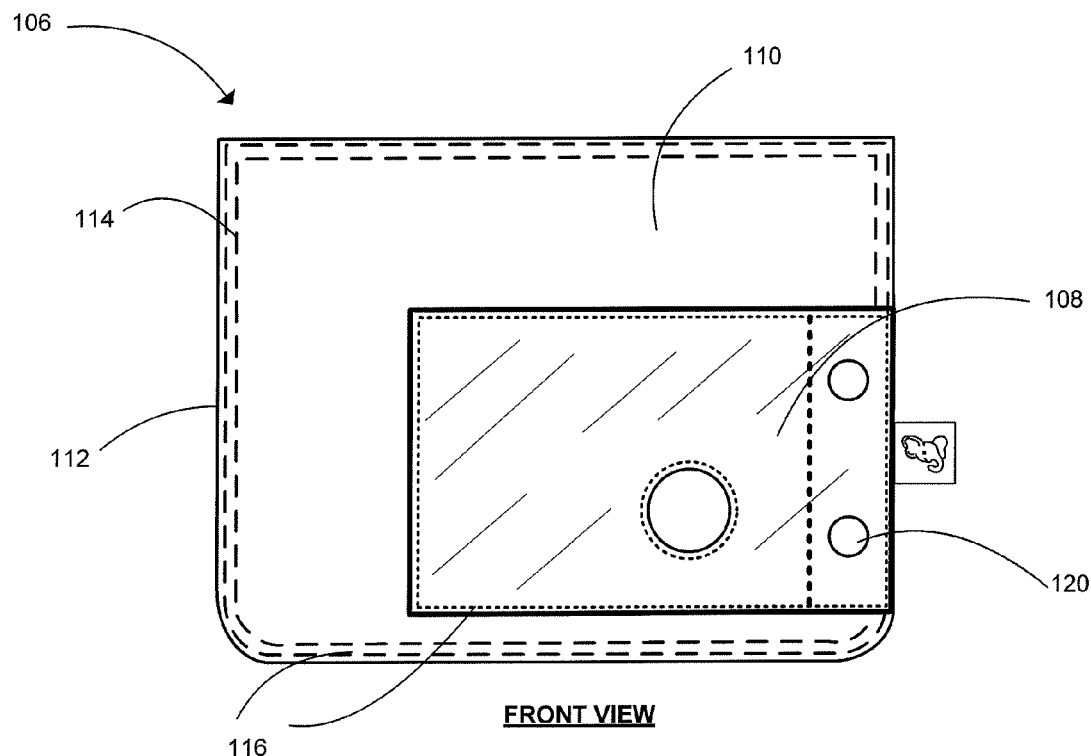
FIG. 2a is a front view of a recorder in a pocket according to one embodiment of the present invention.
Figure 2B:
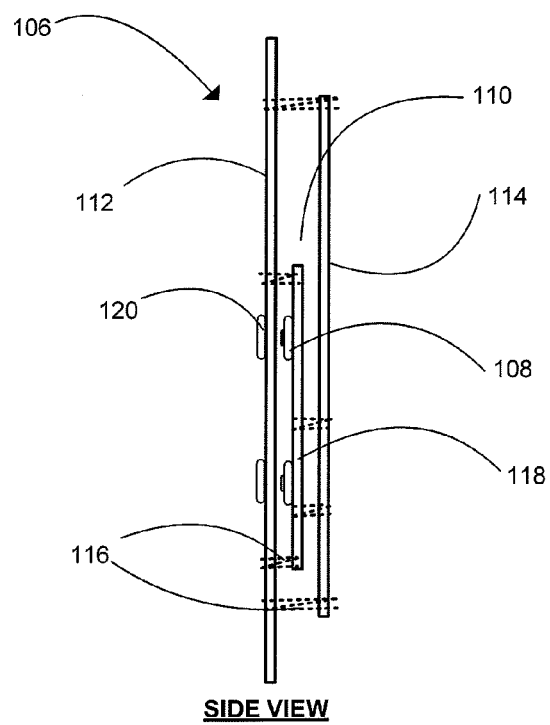

In some embodiments, the recorder is placed at or near the center of the key child's chest. However, other placements are possible. The recording device in pocket 106 may be any device capable of recording audio associated with the child's language environment. One example of a recording device is a digital recorder of the LENA system. The digital recorder may be relatively small and lightweight and can be placed in pocket 106. The pocket 106 can hold the recorder in place in an unobtrusive manner so that the recorder does not distract the key child, other children, and adults that interact with the key child. FIGS. 2a-b illustrate one embodiment of a pocket 106 including a recorder 108. The pocket 106 may be designed to keep the recorder 108 in place and to minimize acoustic interference. The pocket 106 can include an inner area 110 formed by a main body 112 and an overlay 114 connected to the main body 112 via stitches 116 or another connecting mechanism. The main body 112 can be part of the clothing or attached to the article of clothing 104 using stitches or otherwise. A stretch layer 118 may be located in the inner area 110 and attached to the main body 112 and overlay 114 via stitches 116 or other connecting mechanism. The recorder 108 can be located between the main body 112 and the stretch layer 118. The stretch layer 118 may be made of a fabric adapted to stretch but provide a force against the recorder 108 to retain the recorder 108 in its position. For example, the stretch layer may be made from a blend of nylon and spandex, such as 84% nylon, 15% spandex, which helps to keep the recorder in place. The overlay 114 may cover the stretch layer 118 and may include at least one opening where the microphone of recorder 108 is located. The opening can be covered with a material that provides certain desired acoustic properties. In one embodiment, the material is 100% cotton.

The pocket 106 may also include snap connectors 120 by which the overlay 114 is opened and closed to install or remove the recorder 108. In some embodiments, at least one of the stitches 116 can be replaced with a zipper to provider access to the recorder 108 in addition or alternative to using snap connectors 120.

If the recorder 108 includes multiple microphones, then the pocket 106 may include multiple openings that correspond to the placement of the microphones on the recorder 108. The particular dimensions of the pocket 106 may change as the design of the recorder 108 changes, or as the number or type of microphones change. In some embodiments, the pocket 106 positions the microphone relative to the key child's mouth to provide certain acoustical properties and secure the microphone (and optionally the recorder 108) in a manner that does not result in friction noises. The recorder 108 can be turned on and thereafter record audio, including speech by the key child, other children, and adults, as well as other types of sounds that the child encounters, including television, toys, environmental noises, etc. The audio may be stored in the recorder 108. In some embodiments, the recorder can be periodically removed from pocket 106 and the stored audio can be analyzed.

Illustrative Audio Recording Analysis System Implementation

Figure 3:
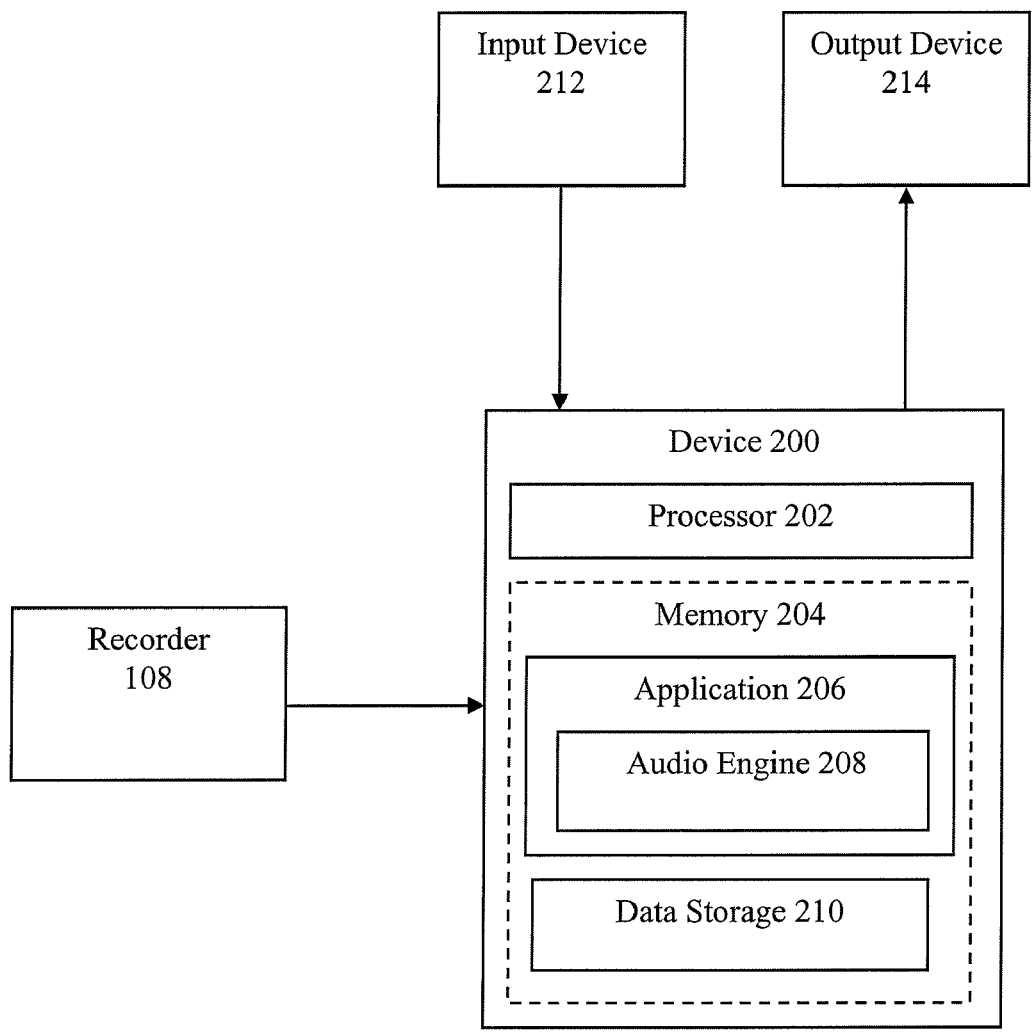
FIG. 3 is a recording processing system according to one embodiment of the present invention.

Methods for analyzing audio recordings from a recorder according to various embodiments of the present invention may be implemented on a variety of different systems. An example of one such system is illustrated in FIG. 3. The system includes the recorder 108 connected to a processor-based device 200 that includes a processor 202 and a computer-readable medium, such as memory 204. The recorder 108 may be connected to the processor-based device 200 via wireline or wirelessly. In some embodiments, the recorder 108 is connected to the device 200 via a USB cable. The device 200 may be any type of processor-based device, examples of which include a computer and a server. Memory 204 may be adapted to store computer-executable code and data. Computer-executable code may include an application 206, such as a data analysis application that can be used to view, generate, and output data analysis. The application 206 may include an audio engine 208 that, as described in more detail below, may be adapted to perform methods according to various embodiments of the present invention to analyze audio recordings and generate metrics associated therewith. In some embodiments, the audio engine 208 may be a separate application that is executable separate from, and optionally concurrent with, application 206. Memory 204 may also include a data storage 210 that is adapted to store data generated by the application 206 or audio engine 208, or input by a user. In some embodiments, data storage 210 may be separate from device 200, but connected to the device 200 via wire line or wireless connection.

The device 200 may be in communication with an input device 212 and an output device 214. The input device 212 may be adapted to receive user input and communicate the user input to the device 200. Examples of input device 212 include a keyboard, mouse, scanner, and network connection. User inputs can include commands that cause the processor 202 to execute various functions associated with the application 206 or the audio engine 208. The output device 214 may be adapted to provide data or visual output from the application 206 or the audio engine 208. In some embodiments, the output device 214 can display a graphical user interface (GUI) that includes one or more selectable buttons that are associated with various functions provided by the application 206 or the audio engine 208. Examples of output device 214 include a monitor, network connection, and printer. The input device 212 may be used to setup or otherwise configure audio engine 208. For example, the age of the key child and other information associated with the key child's learning environment may be provided to the audio engine 208 and stored in local storage 210 during a set-up or configuration.

The audio file stored on the recorder 108 may be uploaded to the device 200 and stored in local storage 210. In one embodiment, the audio file is uploaded in a proprietary format which prevents the playback of the speech from the device 200 or access to content of the speech, thereby promoting identify protection of the speakers. In other embodiments, the audio file is uploaded without being encoded to allow for the storage in local storage 210 and playback of the file or portions of the file.

In some embodiments, the processor-based device 200 is a web server and the input device 212 and output device 214 are combined to form a computer system that sends data to and receives data from the device 200 via a network connection. The input device 212 and output device 214 may be used to access the application 206 and audio engine 208 remotely and cause it to perform various functions according to various embodiments of the present invention. The recorder 108 may be connected to the input device 212 and output device 214 and the audio files stored on the recorder 108 may be uploaded to the device 200 over a network such as an internet or intranet where the audio files are processed and metrics are provided to the output device 214. In some embodiments, the audio files received from a remote input device 212 and output device 214 may be stored in local storage 210 and subsequently accessed for research purposes such on a child's learning environment or otherwise.

To reduce the amount of memory needed on the recorder 108, the audio file may be compressed. In one embodiment, a DVI-4 ADPCM compression scheme is used. If a compression scheme is used, then the file is decompressed after it is uploaded to the device 200 to a normal linear PCM audio format.

Illustrative Methods for Audio Recording Analysis

Figure 4:
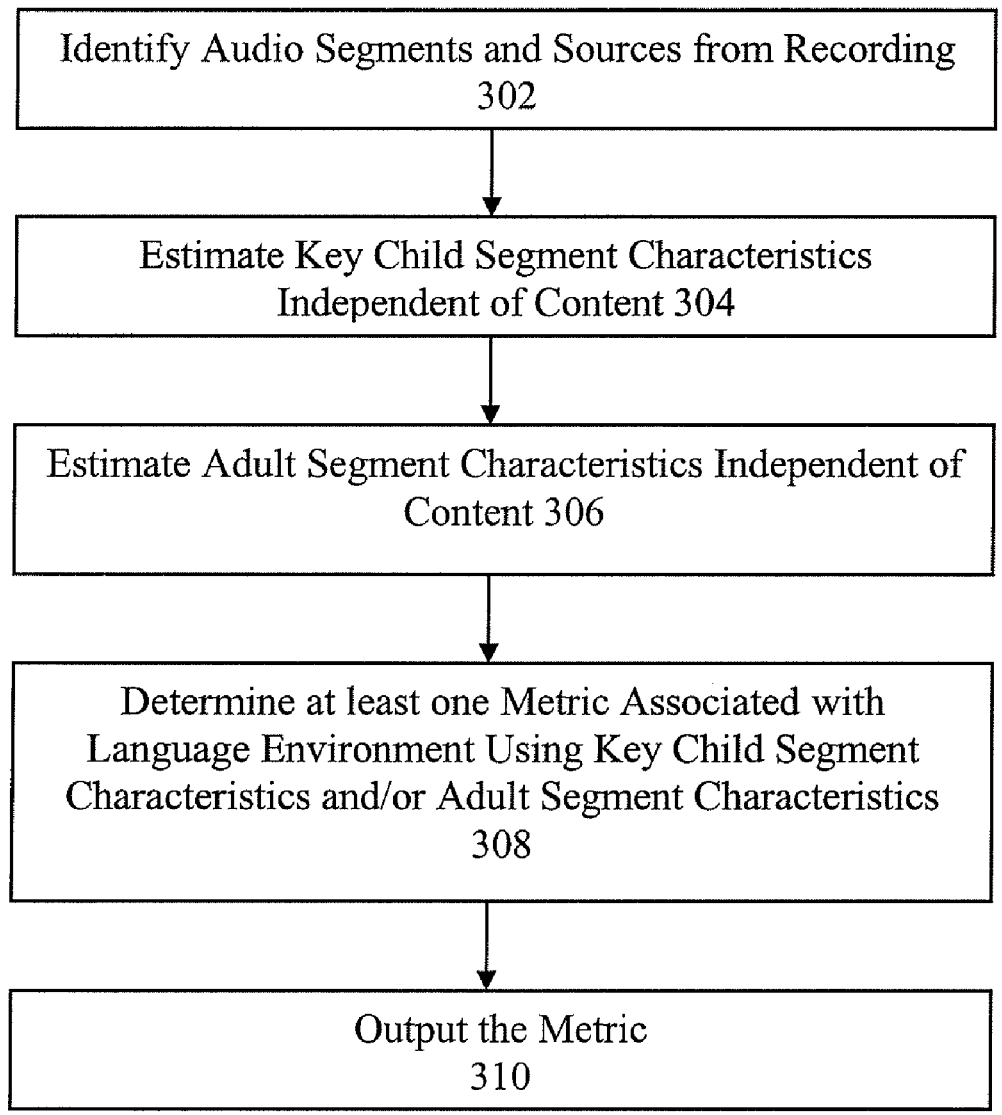
FIG. 4 is flow chart of a method for processing recordings according to one embodiment of the present invention.

Various methods according to various embodiments of the present invention can be used to analyze audio recordings. FIG. 4 illustrates one embodiment of a method for analyzing and providing metrics based on the audio recordings from a key child's language environment. For purposes of illustration only, the elements of this method are described with reference to the system depicted in FIG. 3. Other system implementations of the method are possible.

In block 302, the audio engine 208 divides the recording in one or more audio segments and identifies a segment ID or source for each of the audio segments from the recording received from the recorder 108. This process is referred to herein as segmentation and segment ID. An audio segment may be a portion of the recording having a certain duration and including acoustic features associated with the child's language environment during the duration. The recording may include a number of audio segments, each associated with a segment ID or source. Sources may be an individual or device that produces the sounds within the audio segment. For example, an audio segment may include the sounds produced by the key child, who is identified as the source for that audio segment. Sources also can include other children, adults, electronic devices, noise, overlapped sounds and silence. Electronic devices may include televisions, radios, telephones, toys, and any device that provides recorded or simulated sounds such as human speech.

Sources associated with each of the audio segments may be identified to assist in further classifying and analyzing the recording. Some metrics provided by some embodiments of the present invention include data regarding certain sources and disregard data from other sources. For example, audio segments associated with live speech—directed to the key child—can be distinguished from audio segments associated with electronic devices, since live speech has been shown to be a better indicator and better promoter of a child's language development than exposure to speech from electronic devices.

To perform segmentation to generate the audio segments and identify the sources for each segment, a number of models may be used that correspond to the key child, other children, male adult, female adult, noise, TV noise, silence, and overlap. Alternative embodiments may use more, fewer or different models to perform segmentation and identify a corresponding segment ID. One such technique performs segmentation and segment ID separately. Another technique performs segmentation and identifies a segment ID for each segment concurrently.

Traditionally, a Hidden Markov Model (HMM) with minimum duration constraint has been used to perform segmentation and identify segment IDs concurrently. A number of HMM models may be provided, each corresponding to one source. The result of the model may be a sequence of sources with a likelihood score associated with each based on all the HMM models. The optimal sequence may be searched using a Viterbi algorithm or dynamic programming and the "best" source identified for each segment based on the score. However, this approach may be complex for some segments in part because it uses transition probabilities from one segment to another—i.e. the transition between each segment. Transition probabilities are related to duration modeling of each source or segment. A single segment may have discrete geometric distribution or continuous exponential distribution—which may not occur in most segments. Most recordings may include segments of varying duration and with various types of sources. Although the HMM model may be used in some embodiments of the present invention, alternative techniques may be used to perform segmentation and segment ID.

An alternative technique used in some embodiments of the present invention to perform segmentation and segment ID is a Minimum Duration Gaussian Mixture Model (MD-GMM). Each model of the MD-GMM may include criteria or characteristics associated with sounds from different sources. Examples of models of the MD-GMM include a key child model that includes characteristics of sounds from a key child, an adult model that includes characteristics of sounds from an adult, an electronic device model that includes characteristics of sounds from an electronic device, a noise model that includes characteristics of sounds attributable to noise, an other child model that includes characteristics of sounds from a child other than the key child, a parentese model that includes complexity level speech criteria of adult sounds, an age-dependent key child model that includes characteristics of sounds of a key child of different ages, and a loudness/clearness detection model that includes characteristics of sounds directed to a key child. Some models include additional models. For example, the adult model may include an adult male model that includes characteristics of sounds of an adult male and an adult female model that includes characteristics of sounds of an adult female. The models may be used to determine the source of sound in each segment by comparing the sound in each segment to criteria of each model and determining if a match of a pre-set accuracy exists for one or more of the models.

In some embodiment of the present invention, the MD-GMM technique begins when a recording is converted to a sequence of frames or segments. Segments having a duration of 2*D, where D is a minimum duration constraint, are identified using a maximum log-likelihood algorithm for each type of source. The maximum score for each segment is identified. The source associated with the maximum score is correlated to the segment for each identified segment.

The audio engine 208 may process recordings using the maximum likelihood MD-GMM to perform segmentation and segment ID. The audio engine 208 may search all possible segment sequence under a minimum duration constraint to identify the segment sequence with maximum likelihood. One possible advantage of MD-GMM is that any segment longer than twice the minimum duration (2*D) could be equivalently broken down into several segments with a duration between the minimum duration (D) and two times the minimum duration (2*D), such that the maximum likelihood search process ignores all segments longer than 2*D. This can reduce the search space and processing time. The following is an explanation of one implementation of using maximum likelihood MD-GMM. Other implementations are also possible.

1. Acoustic Feature Extraction.

The audio stream is converted to a stream of feature vectors $\{X_1, X_2 \ldots X_T | I_i \epsilon R\}$ using a feature extraction algorithm, such as the MFCC (mel-frequency cepstrum coefficients).

2. Log likelihood calculation for a segment $\{X_1, X_2 \ldots X_S\}$:

$$L_{cs} = \sum_{i=1}^{S} \log(f_c(X_i)),$$

where $f_c(X_i)$ is the likelihood of frame $X_i$ being in class c The following describes one procedure of maximum likelihood MD-GMM search:

3. Initialize searching variables: $S(c,0,0)=0$, $c=1, \ldots, C$, where c is the index for all segment classes. Generally, the searching variable $S(c,b,n)$ represents the maximum log-likelihood for the segment sequence up to the frame b−1 plus the log-likelihood of the segment from frame b to frame n being in class c.

4. Score frames for $n=1, \ldots, T$, i.e. all feature frames:
$S(c,b,n)=S(c,b,n-1)+\log(f_c(X_n))$, $\forall b, c, n-b<2*D_c$, i.e. the current score at frame n could be derived from the previous score at frame n−1. The searching variable for segments less than twice the minimum duration is retained.

5. Retain a record of the optimal result at frame n (similarly, segments under twice the minimum duration will be considered):

$$S^*(n) = \max_{c,b,2*D_c>(n-b)>D_c} S(c, b, n)$$

$$B^*(n) = \underset{b,(c,b,2*D_c>(n-b)>D_c)}{\operatorname{argmax}} S(c, b, n)$$

$$C^*(n) = \underset{c,(c,b,2*D_c>(n-b)>D_c)}{\operatorname{argmax}} S(c, b, n)$$

6. Initialize new searching variables for segments starting at frame n:

$S(c,n,n)=S^*(n), \forall c$

7. Iterate step 4 to step 6 until the last frame T.
8. Trace back to get the maximum likelihood segment sequence.

The very last segment of the maximum likelihood segment sequence is $(C^*(T),B^*(T),T)$, i.e. the segment starting from frame $B^*(T)$ and ending with frame T with class id of $C^*(T)$. We can obtain the rest segments in the best sequence by using the following back-tracing procedure:

8.1. Initialize back-tracing:

t=T, m=1

$S(m)=(C^*(t),B^*(t),t)$ 8.2. Iterate back-tracing until t=0

C_current=$C^*(t)$ $t=B^*(t)$ if $C^*(t)$=C_current, then do nothing
Otherwise, m=m+1, $S(m)=(C^*(t),B^*(t),t)$ Additional processing may be performed to further refine identification of segments associated with the key child or an adult as sources. As stated above, the language environment can include a variety of sources that may be identified initially as the key child or an adult when the source is actually a different person or device. For example, sounds from a child other than the key child may be initially identified as sounds from the key child. Sounds from an electronic device may be confused with live speech from an adult. Furthermore, some adult sounds may be detected that are directed to another person other than the key child. Certain embodiments of the present invention may implement methods for further processing and refining the segmentation and segment ID to decrease or eliminate inaccurate source identifications and to identify adult speech directed to the key child.

Figure 5:
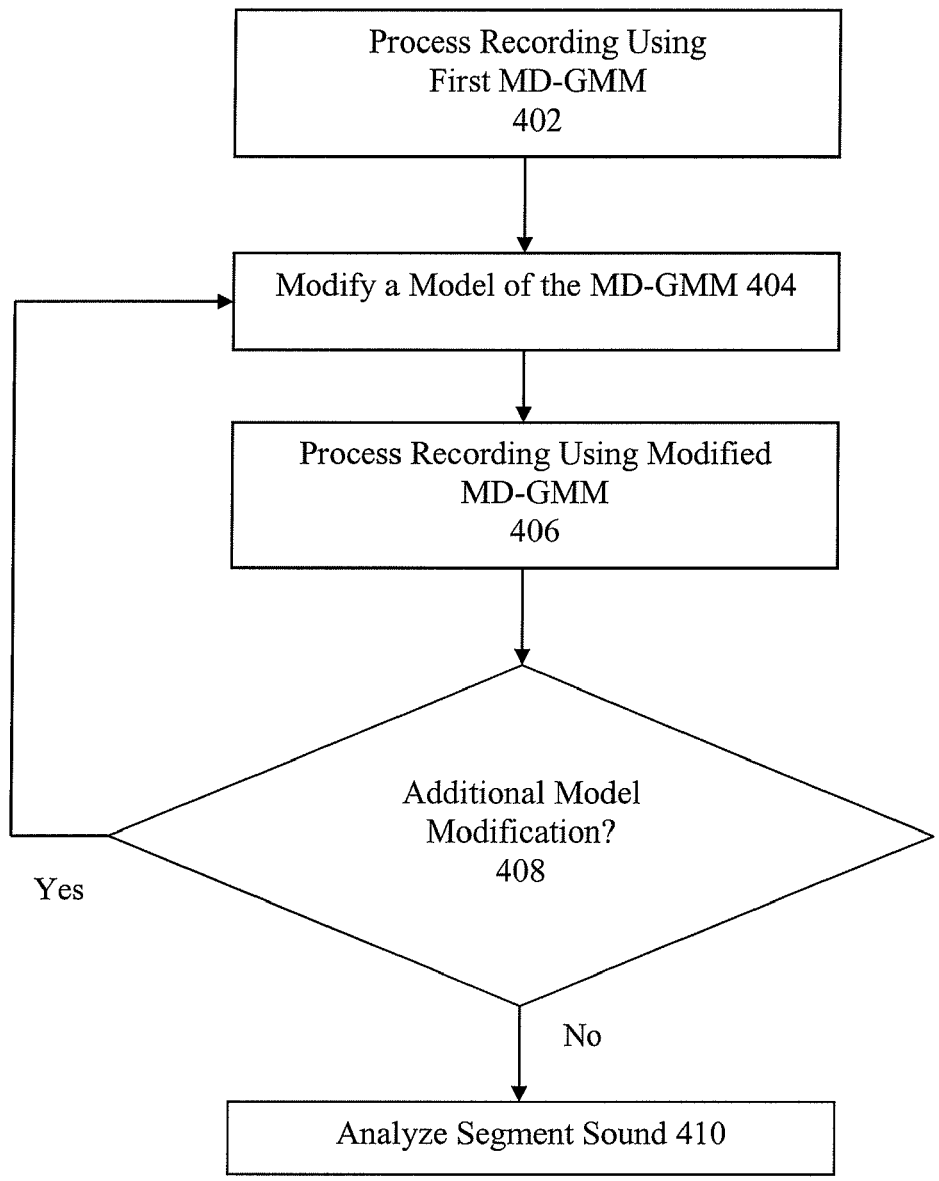
FIG. 5 is a flow chart of a method for performing further recording processing according to one embodiment of the present invention.

Further processing may occur concurrently with, or subsequent to, the initial MD-GMM model described above. FIG. 5 illustrates one embodiment of an adaptation method for further processing the recording by modifying models associated with the MD-GMM subsequent to an initial MD-GMM. In block 402, the audio engine 208 processes the recording using a first MD-GMM. For example, the recording is processed in accordance with the MD-GMM described above to perform an initial segmentation and segment ID.

In block 404, the audio engine 208 modifies at least one model of the MD-GMM. The audio engine 208 may automatically select one or more models of the MD-GMM to modify based on pre-set steps. In some embodiments, if the audio engine 208 detects certain types of segments that may require further scrutiny, it selects the model of the MD-GMM that is most related to the types of segments detected to modify (or for modification). Any model associated with the MD-GMM may be modified. Examples of models that may be modified include the key child model with an age-dependent key child model, an electronic device model, a loudness/clearness model that may further modify the key child model and/or the adult model, and a parentese model that may further modify the key child model and/or the adult model.

In block 406, the audio engine 208 processes the recordings again using the modified models of the MD-GMM. The second process may result in a different segmentation and/or segment ID based on the modified models, providing a more accurate identification of the source associated with each segment.

In block 408, the audio engine 208 determines if additional model modification is needed. In some embodiments, the audio engine 208 analyzes the new segmentation and/or segment ID to determine if any segments or groups of segments require additional scrutiny. In some embodiments, the audio engine 208 accesses data associated with the language environment in data storage 210 and uses it to determine if additional model modification is necessary, such as a modification of the key child model based on the current age of the child. If additional model modification is needed, the process returns to block 404 for additional MD-GMM model modification. If no additional model modification is needed, the process proceeds to block 410 to analyze segment sound.

The following describes certain embodiments of modifying exemplary models in accordance with various embodiments of the present invention. Other models than those described below may be modified in certain embodiments of the present invention.

Age-Dependent Key Child Model

In some embodiments of the present invention, the audio engine 208 may implement an age-dependent key child model concurrently with, or subsequent to, the initial MD-GMM to modify the key child model of the MD-GMM to more accurately identify segments in which other children are the source from segments in which the key child is the source. For example, the MD-GMM may be modified to implement an age-dependent key child model during the initial or a subsequent segmentation and segment ID.

The key child model can be age dependent since the audio characteristics of the vocalizations, including utterances and other sounds, of a key child change dramatically over the time that the recorder 106 may be used. Although the use of two separate models within the MD-GMM, one for the key child and one for other children, may identify the speech of the key child, the use of an age dependent key child model further helps to reduce the confusion between speech of the key child and speech of the other children. In one embodiment, the age-dependent key child models are: 1) less than one-year old, 2) one-year old, 3) two-years old, and 4) three-years old. Alternative embodiments may use other age grouping and/or may use groupings of different age groups. For example, other embodiments could use monthly age groups or a combination of monthly and yearly age groups. Each of the models includes characteristics associated with sounds commonly identified with children of the age group.

In one embodiment of the present invention, the age of the key child is provided to device 200 via input device 212 during a set-up or configuration. The audio engine 208 receives the age of the key child and selects one or more of the key child models based on the age of the key child. For example, if the key child is one year and ten months old, the audio engine 208 may select key child model 2) and key child model 3) or only key child model 2) based on the age of the key child. The audio engine 208 may implement the selected key child model or models by modifying the MD-GMM models to perform the initial or a subsequent segmentation and segment ID.

Electronic Device Model

In order to more accurately determine the number of adult words that are directed to the key child, any segments including sounds, such as words or speech, generated electronically by an electronic device can be identified as such, as opposed to an inaccurate identification as live speech produced by an adult. Electronic devices can include a television, radio, telephone, audio system, toy, or any electronic device that produces recordings or simulated human speech. In some embodiments of the present invention, the audio engine 208 may modify an electronic device model in the MD-GMM to more accurately identify segments from an electronic device source and separate them from segments from a live adult source without the need to determine the content of the segments and without the need to limit the environment of the speaker. (e.g. requiring the removal of or inactivation of the electronic devices from the language environment.)

The audio engine 208 may be adapted to modify and use the modified electronic device model concurrently with, or subsequent to, the initial MD-GMM process. In some embodiments, the electronic device model can be implemented after a first MD-GMM process is performed and used to adapt the MD-GMM for additional determinations using the MD-GMM for the same recording. The audio engine 208 can examine segments segmented using a first MD-GMM to further identify reliable electronic segments. Reliable electronic segments may be segments that are more likely associated with a source that is an electronic device and include certain criteria. For example, the audio engine 208 can determine if one or more segments includes criteria commonly associated with sounds from electronic devices. In some embodiments, the criteria includes (1) a segment that is longer than a predetermined period or is louder than a predetermined threshold; or (2) a series of segments having a pre-set source pattern. An example of one predetermined period is five seconds. An example of one pre-set source pattern can include the following:

Segment 1—Electronic device source;
Segment 2—A source other than the electronic device source (e.g. adult);
Segment 3—Electronic device source;
Segment 4—A source other than the electronic device source; and
Segment 5—Electronic device source.

The reliable electronic device segments can be used to train or modify the MD-GMM to include an adaptive electronic device model for further processing. For example, the audio engine 208 may use a regular K-means algorithm as an initial model and tune it with an expectation-maximization (EMV) algorithm. The number of Gaussians in the adaptive electronic device model may be proportional to the amount of feedback electronic device data and not exceed an upper limit. In one embodiment, the upper limit is 128.

The audio engine 208 may perform the MD-GMM again by applying the adaptive electronic device model to each frame of the sequence to determine a new adaptive electronic device log-likelihood score for frames associated with a source that is an electronic device. The new score may be compared with previously stored log-likelihood score for those frames. The audio engine 208 may select the larger log-likelihood score based on the comparison. The larger log-likelihood score may be used to determine the segment ID for those frames.

In some embodiments, the MD-GMM modification using the adaptive electronic device model may be applied using a pre-set number of consecutive equal length adaptation windows moving over all frames. The recording signal may be divided into overlapping frames having a pre-set length. An example of frame length according to one embodiment of the present invention is 25.6 milliseconds with a 10 milliseconds shift resulting in 15.6 milliseconds of frame overlap. The adaptive electronic device model may use local data obtained using the pre-set number of adaptation windows. An adaptation window size of 30 minutes may be used in some embodiments of the present invention. An example of one pre-set number of consecutive equal length adaptation windows is three. In some embodiments, adaptation window movement does not overlap. The frames within each adaptation window may be analyzed to extract a vector of features for later use in statistical analysis, modeling and classification algorithms. The adaptive electronic device model may be repeated to further modify the MD-GMM process. For example, the process may be repeated three times.

Loudness/Clearness Detection Model

In order to select the frames that are most useful for identifying the speaker, some embodiments of the present invention use frame level near/far detection or loudness/clearness detection model. Loudness/clearness detection models can be performed using a Likelihood Ratio Test (LRT) after an initial MD-GMM process is performed. At the frame level, the LRT is used to identify and discard frames that could confuse the identification process. For each frame, the likelihood for each model is calculated. The difference between the most probable model likelihood and the likelihood for silence is calculated and the difference is compared to a predetermined threshold. Based on the comparison, the frame is either dropped or used for segment ID. For example, if the difference meets or exceeds the predetermined threshold then the frame is used, but if the difference is less than the predetermined threshold then the frame is dropped. In some embodiments, frames are weighted according to the LRT.

The audio engine 208 can use the LRT to identify segments directed to the key child. For example, the audio engine 208 can determine whether adult speech is directed to the key child or to someone else by determining the loudness/clearness of the adult speech or sounds associated with the segments. Once segmentation and segment ID are performed, segment-level near/far detection is performed using the LRT in a manner similar to that used at the frame level. For each segment, the likelihood for each model is calculated. The difference between the most probable model likelihood and the likelihood for silence is calculated and the difference is compared to a predetermined threshold. Based on the comparison, the segment is either dropped or processed further.

Parentese Model

Sometimes adults use baby talk or "parentese" when directing speech to children. The segments including parentese may be inaccurately associated with a child or the key child as the source because certain characteristics of the speech may be similar to that of the key child or other children. The audio engine 208 may modify the key child model and/or adult model to identify segments including parentese and associate the segments with an adult source. For example, the models may be modified to allow the audio engine 208 to examine the complexity of the speech included in the segments to identify parentese. Since the complexity of adult speech is typically much higher than child speech, the source for segments including relatively complex speech may be identified as an adult. Speech may be complex if the formant structures are well formed, the articulation levels are good and the vocalizations are of sufficient duration—consistent with speech commonly provided by adults. Speech from a child may include formant structures that are less clear and developed and vocalizations that are typically of a lesser duration. In addition, the audio engine 208 can analyze formant frequencies to identify segments including parentese. When an adult uses parentese, the formant frequencies of the segment typically do not change. Sources for segments including such identified parentese can be determined to be an adult.

The MD-GMM models may be further modified and the recording further processed for a pre-set number of iterations or until the audio engine 208 determines that the segments IDs have been determined with an acceptable level of confidence. Upon completion of the segmentation and segment ID, the identified segment can be further analyzed to extract characteristics associated with the language environment of the key child.

During or after performing segmentation and segment ID, the audio engine 208 may classify key child audio segments into one or more categories. The audio engine 208 analyzes each segment for which the key child is identified as the source and determines a category based on the sound in each segment. The categories can include vocalizations, cries, vegetative, and fixed signal sounds. Vocalizations can include words, phrases, marginal syllables, including rudimentary consonant-vowel sequences, utterances, phonemes, sequence phonemes, phoneme-like sounds, protophones, lip-trilling sounds commonly called raspberries, canonical syllables, repetitive babbles, pitch variations, or any meaningful sounds which contribute to the language development of the child, indicate at least an attempt by the child to communicate verbally, or explore the capability to create sounds. Vegetative sounds include non-vocal sounds related to respiration and digestion, such as coughing, sneezing, and burping. Fixed signal sounds are related to voluntary reactions to the environment and include laughing, moaning, sighing, and lip smacking. Cries are a type of fixed signal sounds, but are detected separately since cries can be a means of communication.

Figure 6:
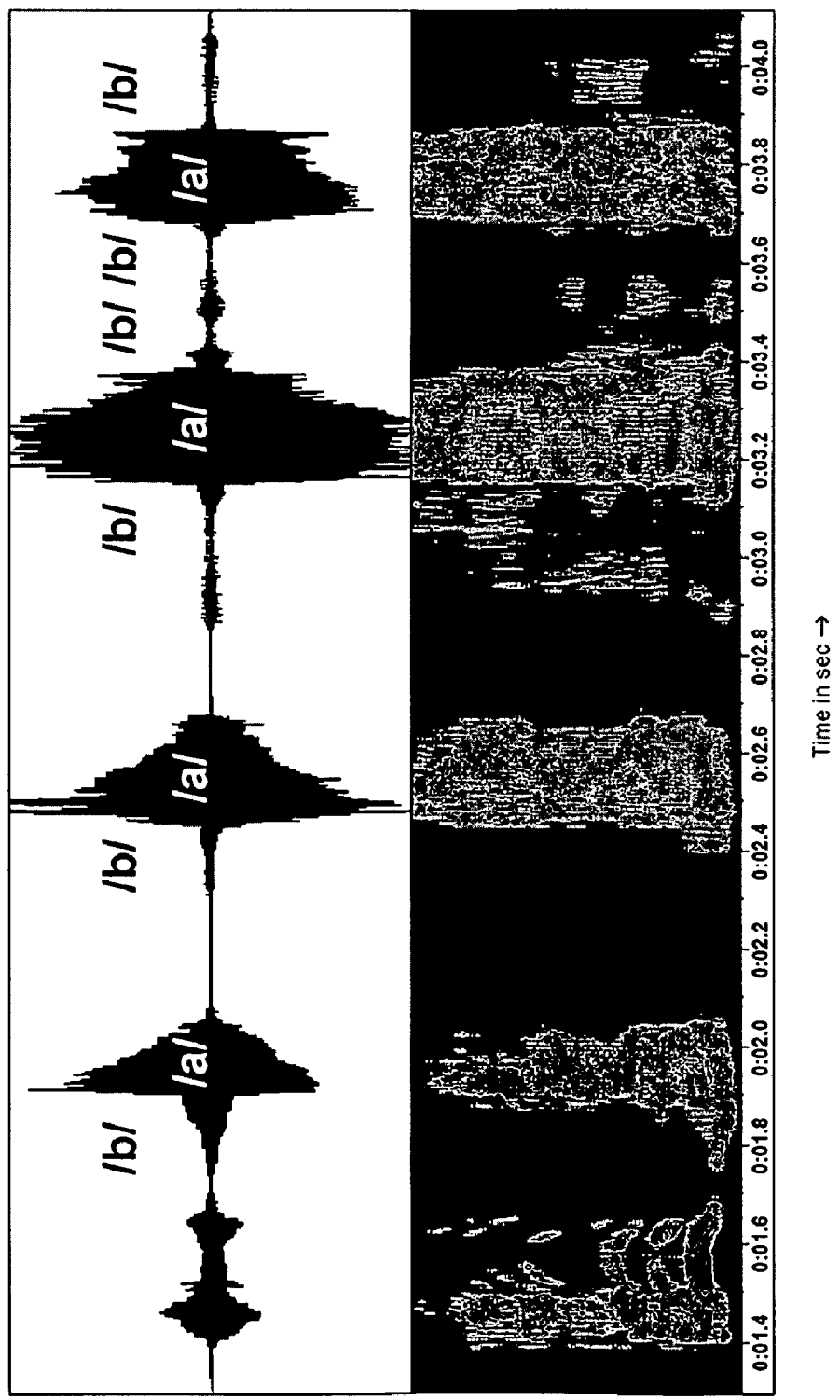
FIG. 6 illustrates sound energy in a segment according to one embodiment of the present invention.

The audio engine 208 may classify key child audio segments using rule-based analysis and/or statistical processing. Rule-based analysis can include analyzing each key child segment using one or more rules. For some rules, the audio engine 208 may analyze energy levels or energy level transitions of segments. An example of a rule based on a pre-set duration is segments including a burst of energy at or above the pre-set duration are identified as a cry or scream and not a vocalization, but segments including bursts of energy less than the pre-set duration are classified as a vocalization. An example of one pre-set duration is three seconds based on characteristics commonly associated with vocalizations and cries. FIG. 6 illustrates energy levels of sound in a segment associated with the key child and showing a series of consonant (/b/) and vowel (/a/) sequences. Using a pre-set duration of three seconds, the bursts of energy indicate a vocalization since they are less than three seconds.

A second rule may be classifying segments as vocalizations that include formant transitions from consonant to vowel or vice versa. FIG. 6 illustrates formant transitions from consonant /b/ to vowel /a/ and then back to consonant /b/, indicative of canonical syllables and, thus, vocalizations. Segments that do not include such transitions may be further processed to determine a classification.

A third rule may be classifying segments as vocalizations if the formant bandwidth is narrower than a pre-set bandwidth. In some embodiments, the pre-set bandwidth is 1000 Hz based on common bandwidths associated with vocalizations.

A fourth rule may be classifying segments that include a burst of energy having a first spectral peak above a pre-set threshold as a cry. In some embodiments, the pre-set threshold is 1500 Hz based on characteristics common in cries.

A fifth rule may be determining a slope of a spectral tilt and comparing it to pre-set thresholds. Often, vocalizations include more energy in lower frequencies, such as 300 to 3000 Hz, than higher frequencies, such as 6000 to 8000 Hz. A 30 dB drop is expected from the first part of the spectrum to the end of the spectrum, indicating a spectral tilt with a negative slope and a vocalization when compared to pre-set slope thresholds. Segments having a slope that is relatively flat may be classified as a cry since the spectral tilt may not exist for cries. Segments having a positive slope may be classified as vegetative sounds.

A sixth rule may be comparing the entropy of the segment to entropy thresholds. Segments including relatively low entropy levels may be classified as vocalizations. Segments with having high entropy levels may be classified as cries or vegetative sounds due to randomness of the energy.

A seventh rule may be comparing segment pitch to thresholds. Segments having a pitch between 250 to 600 Hz may be classified as a vocalization. Segments having a pitch of more than 600 Hz may be classified as a cry based on common characteristics of cries.

An eighth rule may be determining pitch contours. Segments having a rising pitch may be classified as a vocalization. Segments having a falling pitch may be classified as a cry.

A ninth rule may be determining the presence of consonants and vowels. Segments having a mix of consonants and vowels may be classified as vocalizations. Segments having all or mostly consonants may be classified as a vegetative or fixed signal sound.

A rule according to various embodiments of the present invention may be implemented separately or concurrently with other rules. For example, in some embodiments the audio engine 208 implements one rule only while in other embodiments the audio engine 208 implements two or more rules. Statistical processing may be performed in addition to or alternatively to the rule-based analysis.

Statistical processing may include processing segments with an MD-GMM using 2000 or more Gaussians in which models are created using Mel-scale Frequency Cepstral Coefficients (MFCC) and Subband Spectral Centroids (SSC). MFCC's can be extracted using a number of filter banks with coefficients. In one embodiment, forty filter banks are used with 36 coefficients. SSC's may be created using filter banks to capture formant peaks. The number of filter banks used to capture formant peaks may be seven filter banks in the range of 300 to 7500 Hz. Other statistical processing may include using statistics associated with one or more of the following segment characteristics:

Formants;
Formant bandwidth;
Pitch;
Voicing percentage;
Spectrum entropy;
Maximum spectral energy in dB;
Frequency of maximum spectral energy; and
Spectral tilt.

Statistics regarding the segment characteristics may be added to the MFCC-SSC combinations to provide additional classification improvement.

As children age, characteristics associated with each key child segment category may change due to growth of the child's vocal tract. In some embodiments of the present invention, an age-dependent model may be used in addition or alternatively to the techniques described above to classify key child segments. For example, vocalization, cry, and fixed signal/vegetative models may be created for each age group. In one embodiment, twelve different models are used with Group 1 corresponding to 1-2 months old, Group 2 corresponding to 3-4 months old, Group 3 corresponding to 5-6 months old, Group 4 corresponding to 7-8 months old, Group 5 corresponding to 9-10 months old, Group 6 corresponding to 11-12 months old, Group 7 corresponding to 13-14 months old, Group 8 corresponding to 15-18 months old, Group 9 corresponding to 19-22 months old, Group 10 corresponding to 23-26 months old, Group 11 corresponding to 27-30 months old, and Group 12 corresponding to 31-48 months old. Alternative embodiments may use a different number of groups or associate different age ranges with the groups.

The audio engine 208 may also identify segments for which an adult is the source. The segments associated with an adult source can include sounds indicative of conversational turns or can provide data for metrics indicating an estimate of the amount or number of words directed to the key child from the adult. In some embodiments, the audio engine 208 also identifies the occurrence of adult source segments to key child source segments to identify conversational turns.

In block 304, the audio engine 208 estimates key child segment characteristics from at least some of the segments for which the key child is the source, independent of content. For example, the characteristics may be determined without determining or analyzing content of the sound in the key child segments. Key child segment characteristics can include any type of characteristic associated with one or more of the key child segment categories. Examples of characteristics include duration of cries, number of squeals and growls, presence and number of canonical syllables, presence and number of repetitive babbles, presence and number of phonemes, protophones, phoneme-like sounds, word or vocalization count, or any identifiable vocalization or sound element.

In some embodiments, the number and type of phonemes may be identified and tracked. Typically, children age six months or less generally express the same types of phonemes. As children age, they may decrease their use of certain types phonemes and increase their use of the phonemes commonly used within the language environment. In one embodiment used in an English language environment, approximately thirty-nine different types of phonemes are tracked. The number of phonemes may be tracked for each type of phoneme or for a combination of types of phonemes to provide a metric with which the key child's language environment and development can be analyzed.

The length of cry can be estimated by analyzing segments classified in the cry category. The length of cry typically decreases as the child ages or matures and can be an indicator of the relative progression of the child's development.

The number of squeals and growls can be estimated based on pitch, spectral intensity, and dysphonation by analyzing segments classified as vocalizations. A child's ability to produce squeals and growls can indicate the progression of the child's language ability as it indicates the key child's ability to control the pitch and intensity of sound.

The presence and number of canonical syllables, such as consonant and vowel sequences can be estimated by analyzing segments in the vocalization category for relatively sharp formant transitions based on formant contours.

The presence and number of repetitive babbles may be estimated by analyzing segments classified in the vocalization category and applying rules related to formant transitions, durations, and voicing. Babbling may include certain consonant/vowel combinations, including three voiced stops and two nasal stops. In some embodiments, the presence and number of canonical babbling may also be determined. Canonical babbling may occur when 15% of syllable produced are canonical, regardless of repetition. The presence, duration, and number of phoneme, protophones, or phoneme-like sounds may be determined. As the key child's language develops, the frequency and duration of phonemes increases or decreases or otherwise exhibits patterns associated with adult speech.

The number of words or other vocalizations made by the key child may be estimated by analyzing segments classified in the vocalization category. In some embodiments, the number of vowels and number of consonants are estimated using a phone decoder and combined with other segment parameters such as energy level, and MD-GMM log likelihood differences. A least-square method may be applied to the combination to estimate the number of words spoken by the child. In one embodiment of the present invention, the audio engine 208 estimates the number of vowels and consonants in each of the segments classified in the vocalization category and compares it to characteristics associated with the native language of the key child to estimate the number of words spoken by the key child. For example, an average number of consonants and vowels per word for the native language can be compared to the number of consonants and vowels to estimate the number of words. Other metrics/characteristics can also be used, including phoneme, protophones, and phoneme-like sounds.

In block 306, the audio engine 208 estimates characteristics associated with identified segments for which an adult is the source, independent of content. Examples of characteristics include a number of words spoken by the adult, duration of adult speech, and a number of parentese. The number of words spoken by the adult can be estimated using similar methods as described above with respect to the number of words spoken by the key child. The duration of adult speech can be estimated by analyzing the amount of energy in the adult source segments.

In block 308, the audio engine 208 can determine one or more metrics associated with the language environment using the key child segment characteristics and/or the adult segment characteristics. For example, the audio engine 208 can determine a number of conversational turns or "turn-taking" by analyzing the characteristics and time periods associated with each segment. In some embodiments, the audio engine 208 can be configured to automatically determine the one or more metrics. In other embodiments, the audio engine 208 receives a command from input device 212 to determine a certain metric. Metrics can include any quantifiable measurement of the key child's language environment based on the characteristics. The metrics may also be comparisons of the characteristics to statistical averages of the same type of characteristics for other persons having similar attributes, such as age, to the key child. Examples of metrics include average vocalizations per day expressed by the key child, average vocalizations for all days measured, the number of vocalizations per month, the number of vocalizations per hour of the day, the number of words directed to the child from an adult during a selected time period, and the number of conversational turns.

In some embodiments, metrics may relate to the key child's developmental age. Alternative or in addition to identifying delays and idiosyncrasies in the child's development as compared to an expected level, metrics may be development that may estimate causes of such idiosyncratic and developmental delays. Examples of causes include developmental medical conditions such as autism or hearing problems.

Figure 7:
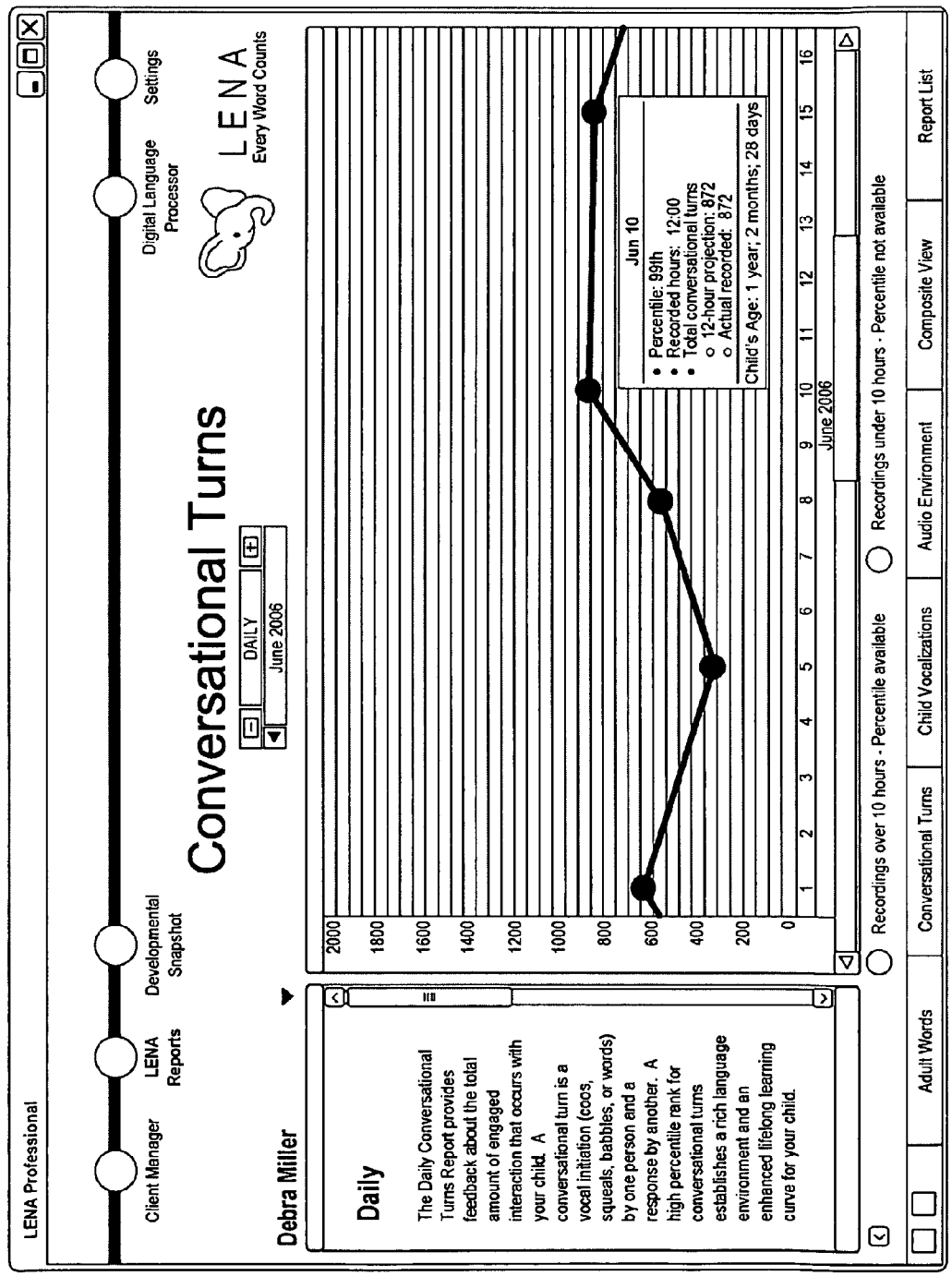
FIGS. 7-12 are screen shots illustrating metrics provided to an output device according to one embodiment of the present invention.
Figure 8:
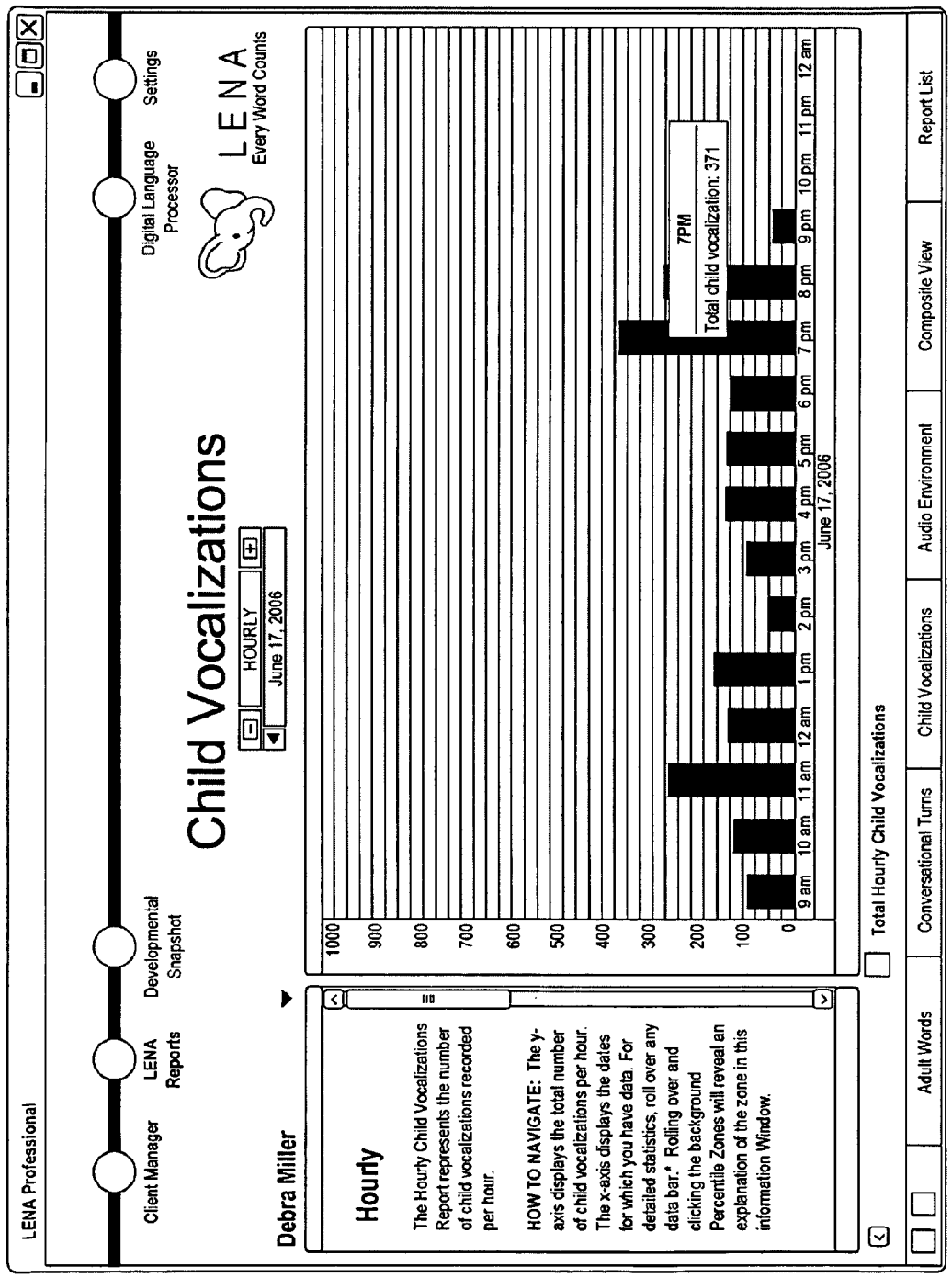
Figure 9:
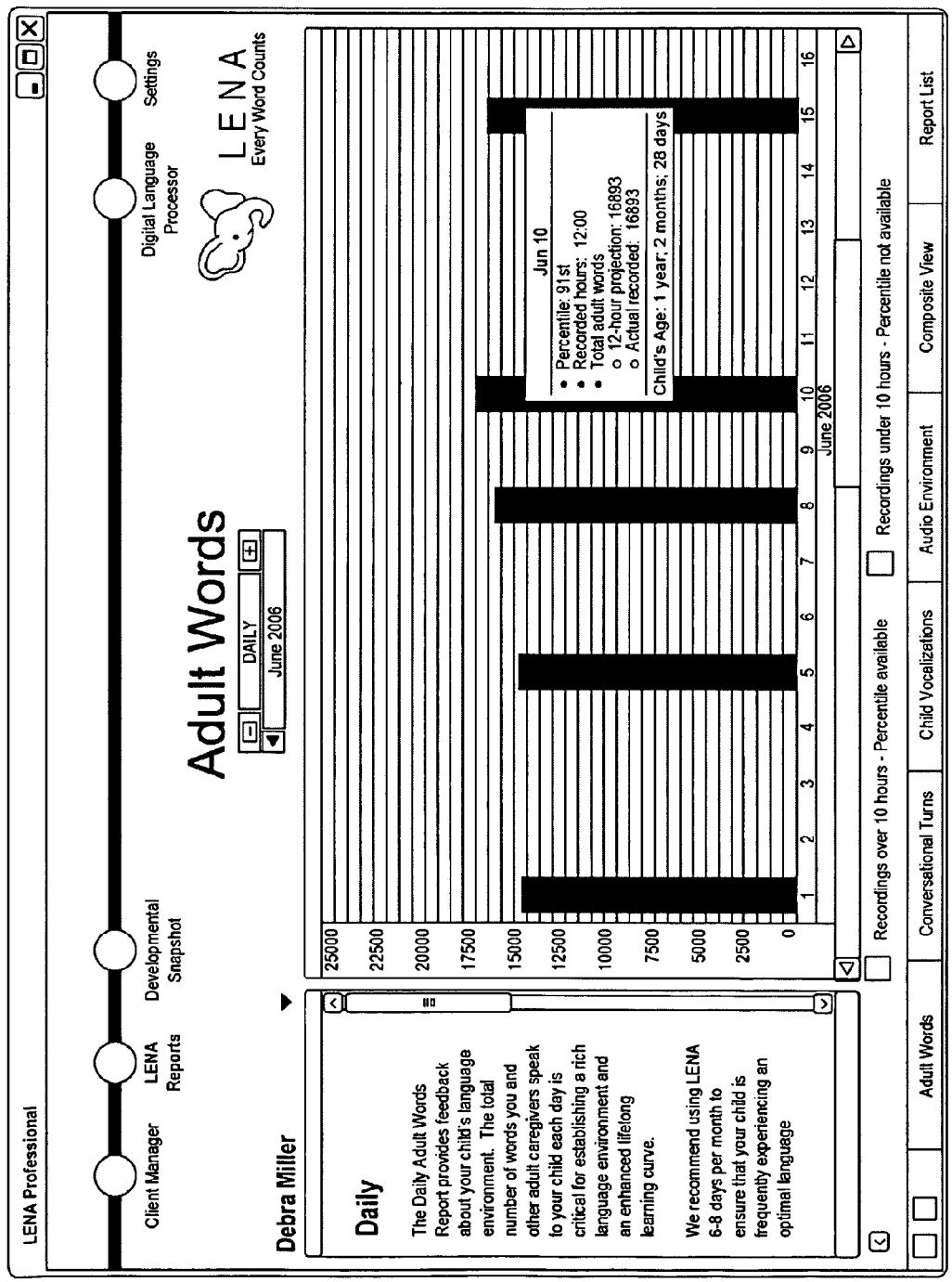
Figure 10:
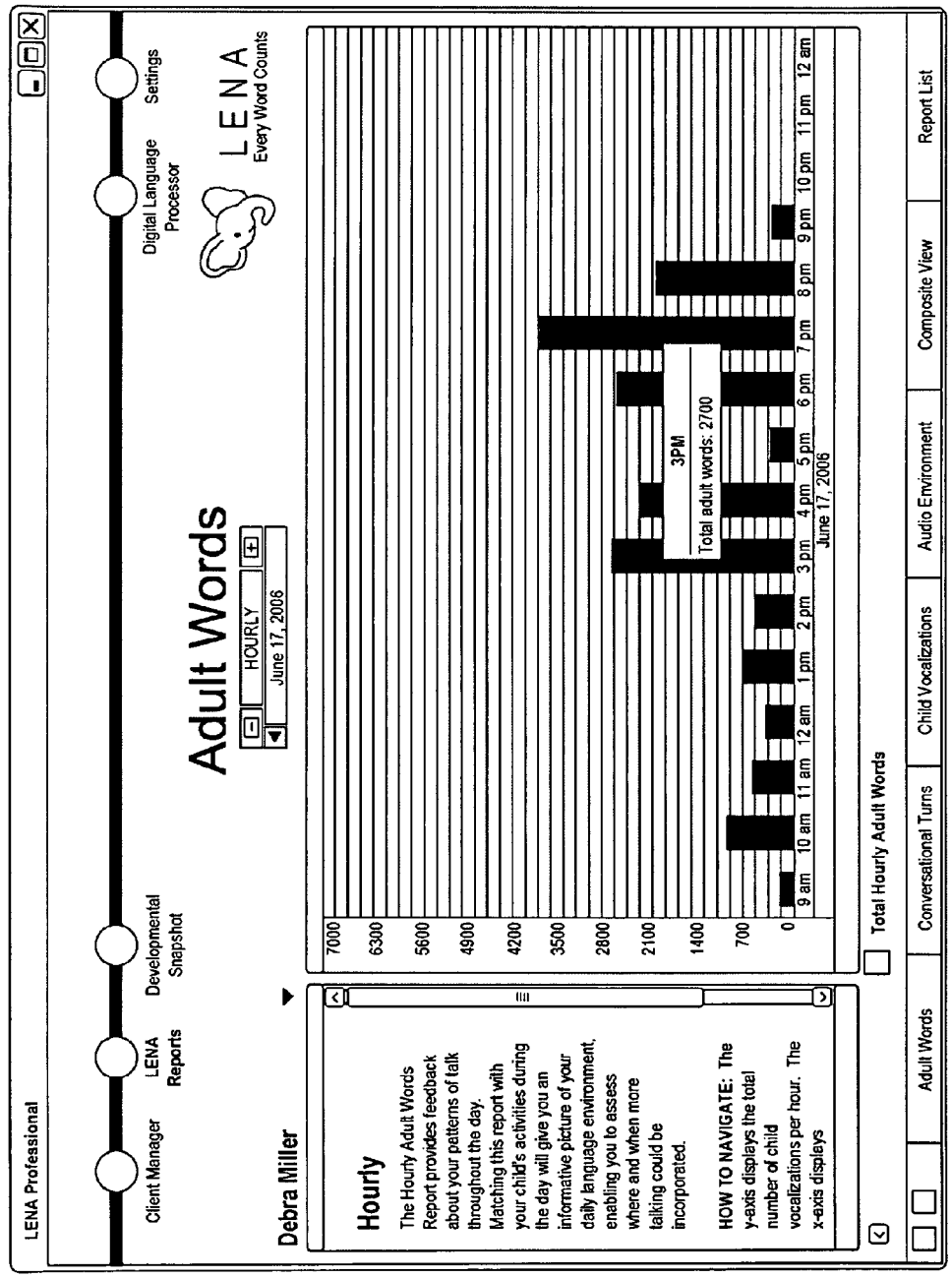
Figure 11:
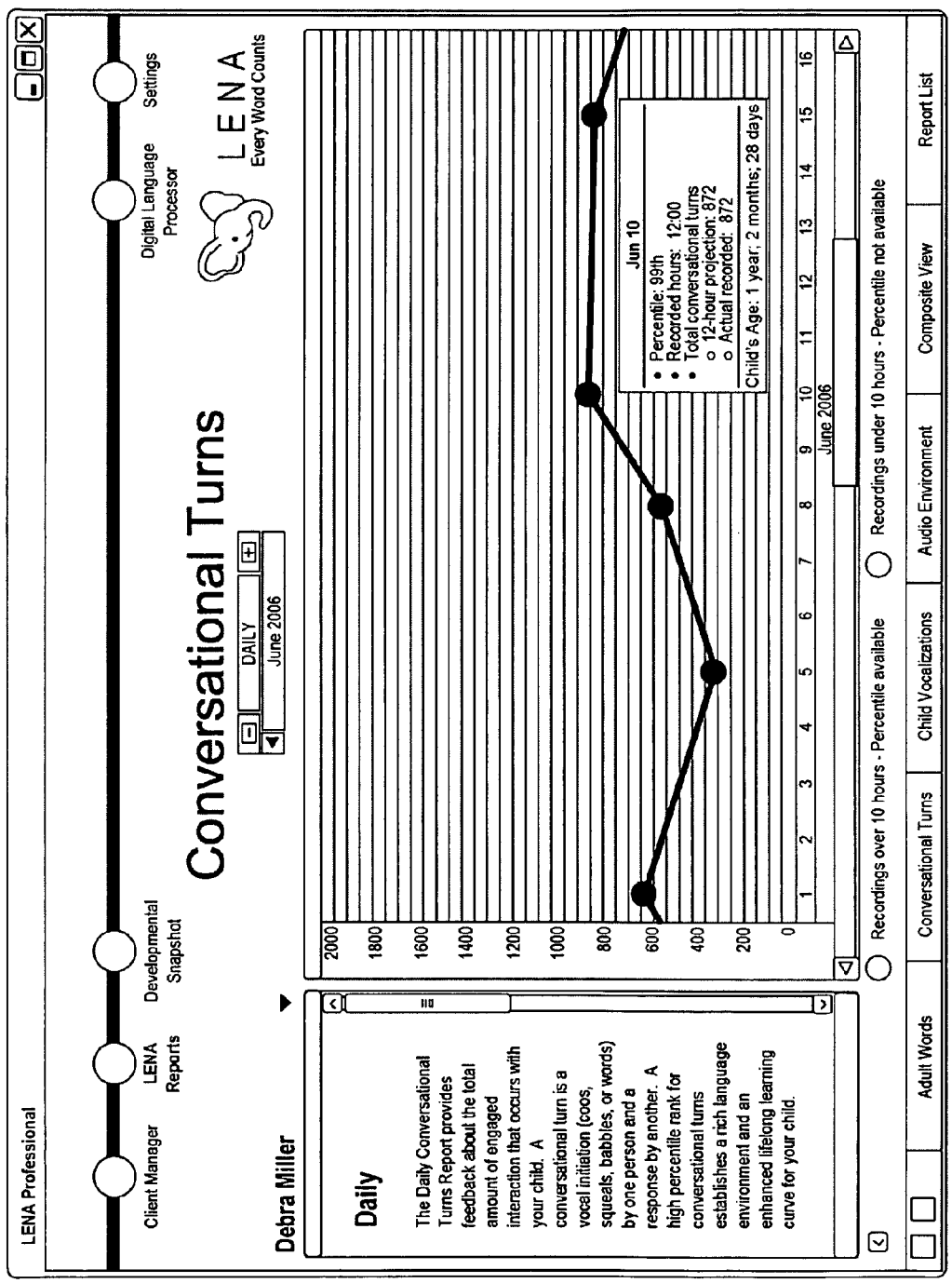
Figure 12:
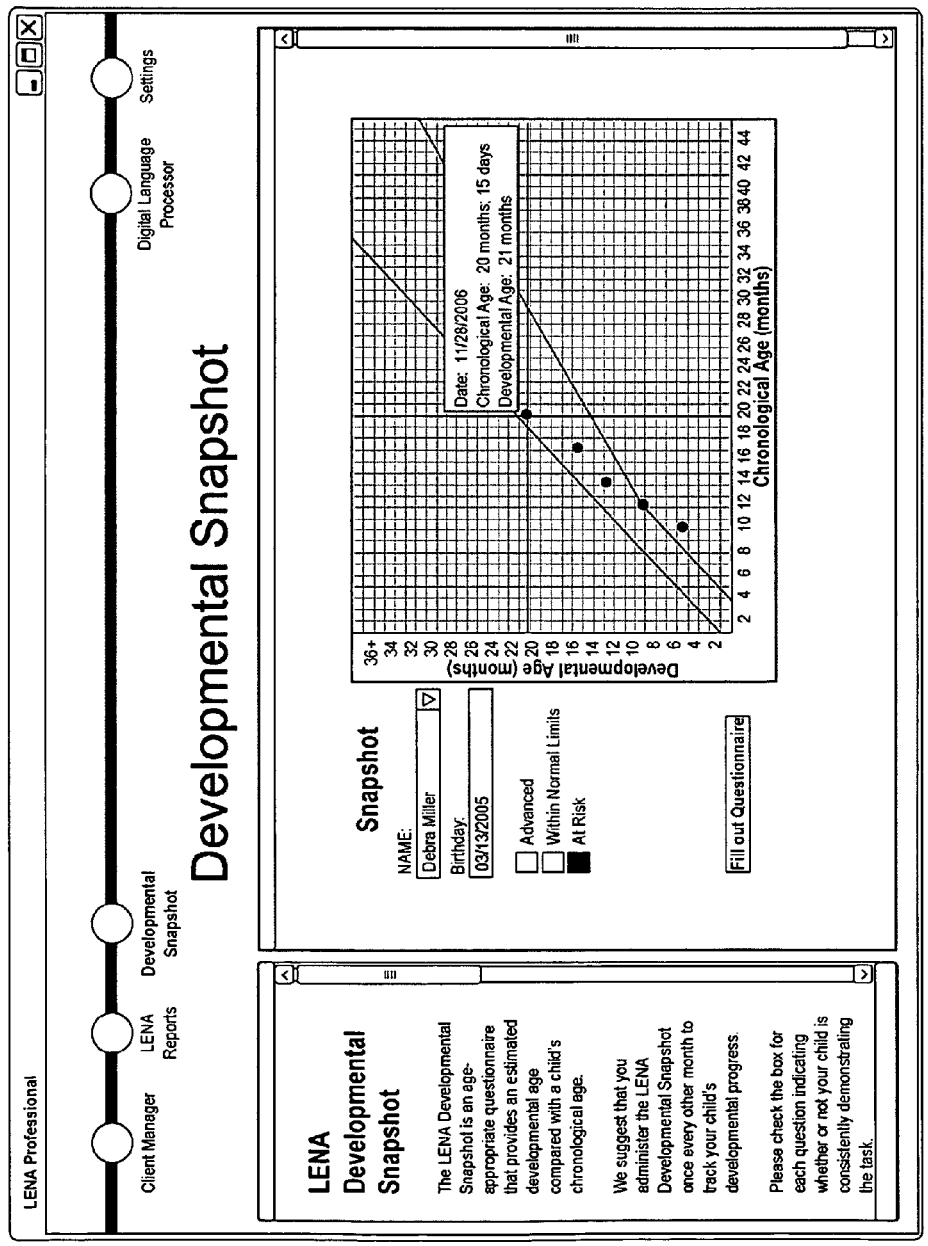

In block 310, the audio engine 208 outputs at least one metric to output device 114. For example, the audio engine 208 may, in response to a command received from input device 212, output a metric associated with a number of words spoken by the child per day to the output device 214, where it is displayed to the user. FIGS. 7-12 are screen shots showing examples of metrics displayed on output device 214. FIG. 7 illustrates a graphical vocalization report showing the number of vocalizations per day attributable to the key child. FIG. 8 illustrates a graphical vocalization timeline showing the number of vocalizations in a day per hour. FIG. 9 illustrates a graphical adult words report showing a number of adult words directed to the key child during selected months. FIG. 10 illustrates a graphical words timeline showing the number of words per hour in a day attributable to the key child. FIG. 11 illustrates a graphical representation of a turn-takings report showing the number of conversational turns experienced by the key child on selected days per month. FIG. 12 illustrates a graphical representation of a key child's language progression over a selected amount of time and for particular characteristics.

In one embodiment, a series of questions are presented to the user to elicit information about the key child's language skills. The questions are based on well-known milestones that children achieve as they learn to speak. Examples of questions include whether the child currently expresses certain vocalizations such as babbling, words, phrases, and sentences. Once the user responds in a predetermined manner to the questions, no new questions are presented and the user is presented with a developmental snapshot of the speaker based on the responses to the questions. In one embodiment, once three "No" answers are entered, indicating that the child does not exhibit certain skills, the system stops and determines the developmental snapshot. The questioning may be repeated periodically and the snap shot developed based on the answers and, in some embodiments, data from recording processing. An example of a snapshot may include the language development chart shown in FIG. 12. In an alternative environment, the series of questions is answered automatically by analyzing the recorded speech and using the information obtained to automatically answer the questions.

In yet another alternative, the recorded speech is analyzed to detect and identify phoneme, protophones, and phoneme-like sounds, which are then further analyzed using statistical processing to determine a key-child's developmental age. The statistical processing includes determining a probability model of the phoneme, protophones, and phoneme-like sounds decoded in the key child segments and applying a linear regression model to estimate the developmental age.

Certain embodiments of the present invention do not require that the key child or other speakers train the system, as is required by many voice recognition systems. Recording systems according to some embodiments of the present invention may be initially benchmarked by comparing certain determinations made by the system with determinations made by reviewing a transcript. To benchmark the performance of the segmenter, the identification of 1) key child v. non-key child and 2) adult v. non-adult were compared, as well as the accuracy of the identification of the speaker/source associated with the segments.

Although the foregoing describes the processing of the recorded speech to obtain metrics, such as word counts and conversational turns, other types of processing are also possible, including the use of certain aspects of the invention in conventional speech recognition systems. The recorded speech file could be processed to identify a particular word or sequence of words or the speech could be saved or shared. For example, a child's first utterance of "mama" or "dada" could be saved much as a photo of the child is saved or shared via e-mail with a family member.

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A method comprising:
capturing an audio recording from a language environment of a key child,
segmenting the audio recording into a plurality of segments;

identifying a segment ID for each of the plurality of segments, the segment ID identifying a source for audio in the segment, wherein segmenting the audio recording into the plurality of segments and identifying the segment ID for each of the plurality of segments comprises using a Minimum Duration Gaussian Mixture Model (MD-GMM), and wherein the segments identified using the MD-GMM are at least a minimum duration D, and any segments with a duration longer than 2*D are broken down into several segments with a duration between D and 2*D;

estimating key child segment characteristics based in part on at least one of the plurality of key child segments, wherein the key child segment characteristics are estimated independent of content of the plurality of key child segments, wherein the content is the meaning of the plurality of key child segments;

determining at least one metric associated with the language environment using the key child segment characteristics; and outputting the at least one metric.

2. The method of claim 1, further comprising:
identifying a plurality of adult segments from the plurality of segments, each of the plurality of adult segments having the adult as the segment ID;
estimating adult segment characteristics based in part on at least one of a plurality of adult segments, wherein the adult segment characteristics are estimated independent of content of the plurality of adult segments; and
wherein determining at least one metric associated with the language environment comprises using the adult segment characteristics.

3. The method of claim 2 wherein adult segment characteristics comprise at least one of:
a word count;
a duration of speech;
a vocalization count; and
a parentese count.

4. The method of claim 2 wherein the at least one metric comprises at least one of:
number of key child vocalizations in a pre-set time period;
number of conversational turns, wherein the conversational turns comprise a sound from one of the adult or key child and a response to the sound from one of the adult or key child; and
number of adult words directed to the key child in a pre-set time period.

5. The method of claim 1 wherein using the MD-GMM comprises:
performing a first segmentation and a first segment ID using a first MD-GMM, the first MD-GMM comprising a plurality of models;
generating a second MD-GMM by modifying at least one of the plurality of models; and
segmenting the audio recording into the plurality of segments and identifying the segment ID for each of the plurality of segments using the second MD-GMM.

6. The method of claim 5 wherein the plurality of models comprises a key child model, an electronic device model, and an adult model, wherein:
the key child model comprises criteria associated with sounds from a child;
the electronic device model comprises criteria associated with sounds from an electronic device; and
the adult model comprises criteria associated with sounds from adults.

7. The method of claim 6, further comprising at least one of:
modifying the key child model using an age-dependent key child model, wherein the age-dependent key child model comprises criteria associated with sounds from children of a plurality of ages;
modifying the electronic device model;
modifying at least one of the key child model and the adult model using a loudness/clearness detection model, wherein the loudness/clearness detection model comprises a Likelihood Ratio Test; and
modifying at least one of the key child model and the adult model using a parentese model, wherein the parentese model comprises complexity levels associated with sounds of adults.

8. The method of claim 1, further comprising:
classifying each of the plurality of key child segments into one of:
vocalizations;
cries;
vegetative sounds; and
fixed signal sounds; and
wherein the key child segment characteristics are estimated using only key child segments classified into at least one of vocalizations and cries.

9. The method of claim 8 wherein classifying each of the plurality of key child segments comprises using at least one of rule-based analysis and statistical processing.

10. The method of claim 1 wherein key child segment characteristics comprise at least one of:
duration of cries;
number of squeals;
number of growls;
presence of canonical syllables;
number of canonical syllables;
presence of repetitive babbles;
number of repetitive babbles;
presence of protophones;
number of protophones;
duration of protophones;
presence of phoneme-like sounds;
number of phoneme-like sounds;
duration of phoneme-like sounds;
presence of phonemes;
number of phonemes;
duration of phonemes;
word count; and
vocalization count.

11. A method comprising:
capturing an audio recording from a language environment of a key child;
segmenting the audio recording into a plurality of segments and identifying a segment ID for at least one of the plurality of segments using a Minimum Duration Gaussian Mixture Model (MD-GMM), the segment ID identifying a key child), wherein the segments identified using the MD-GMM are at least a minimum duration D, and any segments with a duration longer than 2*D are broken down into several segments with a duration between D and 2*D;
estimating key child segment characteristics based in part on the at least one of the plurality of segments, wherein the key child segment characteristics are estimated independent of content of the plurality of segments, wherein the content is the meaning of the plurality of key child segments;

determining at least one metric associated with the language environment using the key child segment characteristics; and outputting the at least one metric, wherein the key child characteristics comprise a number of vowels and a number of consonants in the at least one of the plurality of segments, wherein the determining at least one metric associated with the language environment using the key child segment characteristics comprises comparing the number of vowels an number of consonants in the at least one of the plurality of segments to attributes associated with a native language of the key child to determine a total number of words spoken by the key child.

12. The method of claim 1 wherein the MD-GMM comprises a key child model;

modifying the key child model using an age-dependent key child model; and wherein segmenting the audio recording into the plurality of segments and identifying the segment ID for at least one of the plurality of segments using the MD-GMM comprises using the MD-GMM comprising the modified key child model.

13. The method of claim 12 wherein the age-dependent key child model comprises:

a first model group comprising characteristics of sounds of children of a first age; and a second model group comprising characteristics of sounds of children of a second age.

14. A system comprising:

a recorder adapted to capture audio recordings from a language environment of a key child;

a processor-based device, wherein the recorder provides the audio recordings to the processor-based device, and the processor-based device comprising an application having an audio engine adapted to segment the audio recording into a plurality of segments and identify a segment ID for each of the plurality of segments, wherein at least one of the plurality of segments is associated with a key child segment ID, wherein the audio engine segments the audio recording and identifies a segment ID for each of the plurality of segments using a Minimum Duration Gaussian Mixture Model (MD-GMM), and wherein the segments identified using the MD-GMM are at least a minimum duration D, and any segments with a duration longer than 2*D are broken down into several segments with a duration between D and 2*D, the audio engine being further adapted to:

estimate key child segment characteristics based on the at least one of the plurality of segments, wherein the audio engine estimates key child segment characteristics independent of content of the at least one of the plurality of segments, wherein the content is the meaning of the plurality of key child segments;

determine at least one metric associated with the language environment using the key child segment characteristics; and output the at least one metric to an output device.

15. The system of claim 14 wherein the audio engine uses the MD-GMM by:

performing a first segmentation and a first segment ID using a first MD-GMM, the first MD-GMM comprising a plurality of models;

generating a second MD-GMM by modifying at least one of the plurality of models; and segmenting the audio recording into the plurality of segments and identifying the segment ID for each of the plurality of segments using the second MD-GMM.

16. The system of claim 15 wherein the plurality of models comprise a key child model, an electronic device model, and an adult model.

17. The system of claim 16, further comprising at least one of:

the audio engine adapted to modify the key child model using an age-dependent key child model, the age-dependent key child model comprising:

a first model group comprising characteristics of sounds of children of a first age; and a second model group comprising characteristics of sounds of children of a second age;

the audio engine adapted to modify the electronic device model, the electronic device model comprising criteria associated with sounds generated by an electronic device;

the audio engine adapted to modify at least one of the key child model and the adult model using a loudness/clearness detection model, the loudness/clearness detection model comprising a Likelihood Ratio Test; and the audio engine adapted to modify at least one of the key child model and the adult model using a parentese model, the parentese model comprising a complexity level of speech associated with adult sounds.

18. The system of claim 14 wherein the audio engine uses the MD-GMM by:

scoring each of the plurality of segments using log-likelihood scoring and a plurality of models; and analyzing the scored plurality of segments to assign the segment ID to each of the plurality of segments.

19. The system of claim 14 wherein the MD-GMM comprises a plurality of models, each model comprising criteria associated with sounds and sources of sounds, the plurality of models comprising at least one of:

a key child model comprising criteria associated with sounds from the key child;

an adult model comprising criteria associated with sounds from an adult;

a noise model comprising criteria associated with sounds attributable to noise;

an electronic device model comprising criteria associated with sounds from an electronic device;

an other child model comprising criteria associated with sounds from a child other than the key child;

an age-dependent key child model comprising criteria associated with sounds from key children of a plurality of ages; and a parentese model comprising a complexity level of characteristics of sounds of adults.

20. The system of claim 19 wherein the audio engine is adapted to:

use the other child model to identify at least one of the plurality of segments comprising sounds from a child other than the key child; and assign an other child segment ID to the identified at least one of the plurality of segments.

21. The system of claim 19 wherein the audio engine is adapted to:

use the noise model to identify at least one of the plurality of segments comprising sounds from noise; and assign a noise segment ID to the identified at least one of the plurality of segments.

22. The system of claim 19 wherein the audio engine is adapted to:

use the key child model to identify at least one of the plurality of segments comprising sounds with characteristics associated with the sounds from the key child; and assign the key child segment ID to the identified at least one of the plurality of segments.

23. The system of claim 19 wherein the audio engine is adapted to:
- use the adult model to identify at least one of the plurality of segments comprising sounds from an adult; and
- assign an adult segment ID to the identified at least one of the plurality of segments.

24. The system of claim 19 wherein the audio engine is adapted to:
- use the electronic model to identify at least one of the plurality of segments comprising sounds having criteria associated with electronic device sounds, the criteria associated with electronic device sounds comprising at least one of:
  - duration longer than a pre-set period; and
  - a series of segments having a pre-set source pattern; and
- assign a noise segment ID to the identified at least one of the plurality of segments.

25. The system of claim 19 wherein the age-dependent key child model comprises:
- a first model group comprising criteria of sounds of children of a first age; and
- a second model group comprising criteria of sounds of children of a second age; and
- wherein the audio engine is adapted to:
  - select one of the first model group and the second model group based on information associated with the key child;
  - use the selected model group to identify at least one of the plurality of segments comprising sounds having characteristics of the selected model group; and
  - assign the key child segment ID to the identified at least one of the plurality of segments.

26. The system of claim 19 wherein the audio engine is adapted to:
- use the parentese model to identify at least one of the plurality of segments comprising sounds having the complexity level of characteristics; and
- assign an adult segment ID to the identified at least one of the plurality of segments.

* * * * *

UNITED STATES PATENT AND TRADEMARK OFFICE
CERTIFICATE OF CORRECTION

PATENT NO. : 8,078,465 B2  
APPLICATION NO. : 12/018647  
DATED : December 13, 2011  
INVENTOR(S) : Terrance D. Paul et al.

Page 1 of 1

It is certified that error appears in the above-identified patent and that said Letters Patent is hereby corrected as shown below:

On the Cover Page, at Item 75, the listing of inventors includes a misspelled last name. Please delete the current listing.

"Terrance Paul, Boulder, CO (US); Dongxin Xu, Boulder, CO (US); Umit Yapenel, Superior CO (US); Sharmistha Gray, Thornton, CO (US)"

and insert the corrected listing:

--Terrance Paul, Boulder, CO (US); Dongxin Xu, Boulder, CO (US); Umit Yapanel, Superior CO (US); Sharmistha Gray, Thornton, CO (US)--

Signed and Sealed this  
Seventeenth Day of April, 2012

David J. Kappos  
*Director of the United States Patent and Trademark Office*